Figure 2B:
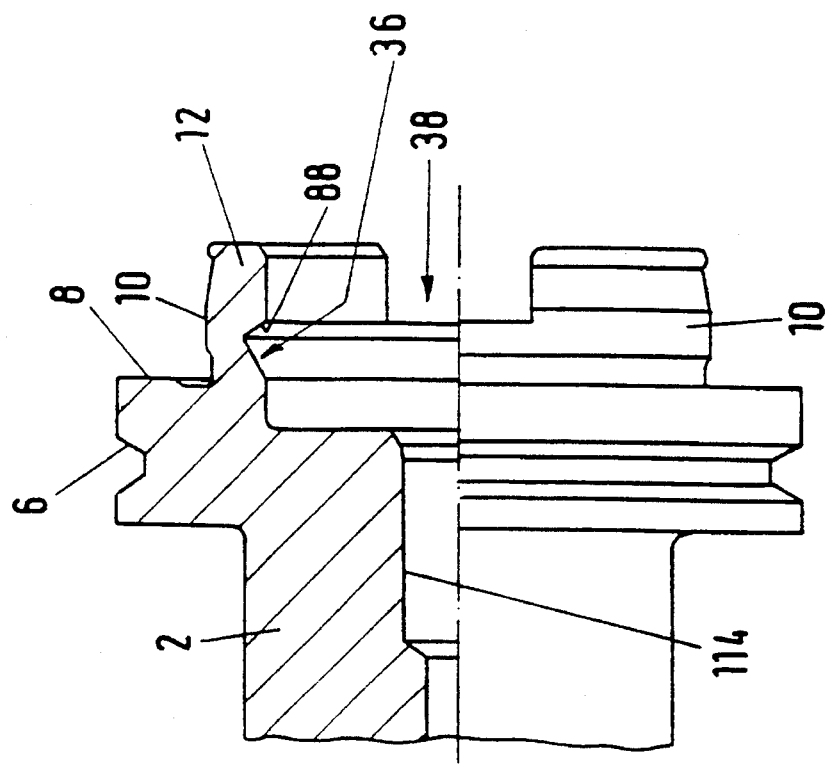

United States Patent [19]

Reinauer et al.

[11] Patent Number: 5,509,763
[45] Date of Patent: Apr. 23, 1996

[54] COUPLING DEVICE FOR A WORKPIECE OR TOOL HOLDER

[75] Inventors: Josef Reinauer, Sigmaringen; Wolfgang Effenberger, Kempton; Franz Friedl, Marktoberdort, all of Germany

[73] Assignee: Gottlieb Guhring KG, Albstadt, Germany

[21] Appl. No.: 331,926

[22] Filed: Oct. 31, 1994

Related U.S. Application Data

[63] Continuation of Ser. No. 445,834, Mar. 10, 1993, Pat. No. 5,443,340.

[30] Foreign Application Priority Data

| May 11, 1987 | [DE] | Germany | 37 15 658.6 |
| May 22, 1987 | [DE] | Germany | 37 17 270.0 |
| Feb. 2, 1988 | [DE] | Germany | 38 03 017.9 |
| Mar. 4, 1988 | [DE] | Germany | 38 07 140.1 |

[51] Int. Cl.⁶ .............................. B23C 5/26; B23B 31/02
[52] U.S. Cl. ..................................... 409/233; 408/239 R
[58] Field of Search ....................................... 409/232, 233, 409/234, 231; 408/238, 239 R, 239 A; 82/160, 161

[56] References Cited

U.S. PATENT DOCUMENTS

| 1,617,672 | 2/1927 | Delany | 279/108 |
| 3,593,614 | 7/1971 | Galbarini | 409/232 |
| 3,914,853 | 3/1974 | Jauch . | |
| 4,135,848 | 1/1979 | Hughes et al. . | |
| 4,391,543 | 7/1983 | Elsing | 403/322 X |
| 4,715,753 | 12/1987 | Tack | 409/234 |
| 4,812,091 | 3/1989 | Barbieux | 409/233 |

FOREIGN PATENT DOCUMENTS

| 0189697 | 8/1986 | European Pat. Off. . |
| 2177710 | 11/1973 | France . |
| 2736412 | 3/1978 | Germany . |
| 2741810 | 3/1979 | Germany . |
| 3136147 | 3/1983 | Germany . |
| 3514829 | 11/1986 | Germany . |
| 3533623 | 4/1987 | Germany . |

OTHER PUBLICATIONS

Din–Blatt 6366, Apr. 4, 1964, pp. 200–202.

Primary Examiner—William Briggs
Attorney, Agent, or Firm—Oblon, Spivak, McClelland, Maier & Neustadt

[57] ABSTRACT

A coupling system between a tool system module, such as, for example, a tool receptacle, and a machine tool, such as, for example, a spindle. In order to provide for rapid initiation and release of the connection between these components while making large axial forces available, this incorporates a clamping system with an operating rod, by means of which a wedge drive is controlled, with which clamping elements that are provided in one of the parts that are to be coupled can be forced essentially radially outwards into suitably configured recesses in the other part that is to be coupled. The clamping elements are formed from at least three clamp-like clamping claws that are arranged at equal angular intervals from each other, these being arranged essentially parallel to a centering extension of the tool receptacle; while being supported in a centering recess of the spindle a claw section of these clamping claws that in the coupled state lies radially within the centering extension these can be pivoted into a groove-like recess of the centering extension. This coupling system is distinguished by great flexibility with regard to potential use and by the fact that it can be produced economically.

2 Claims, 26 Drawing Sheets

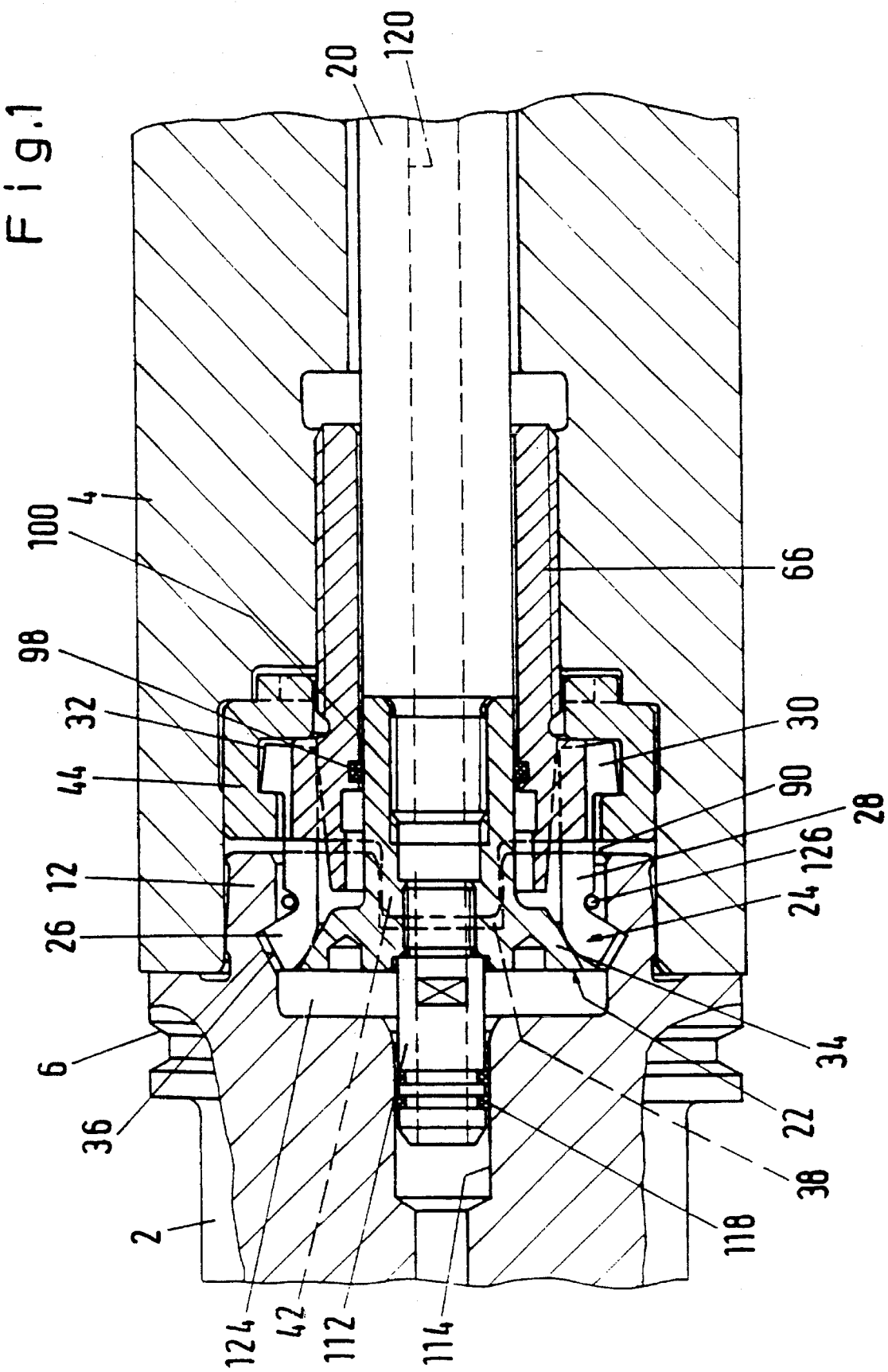

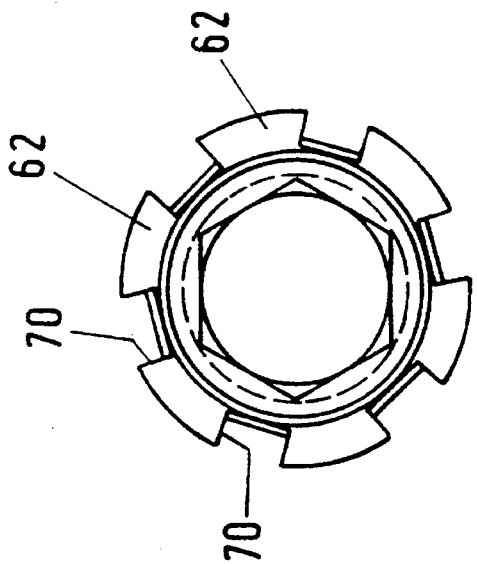
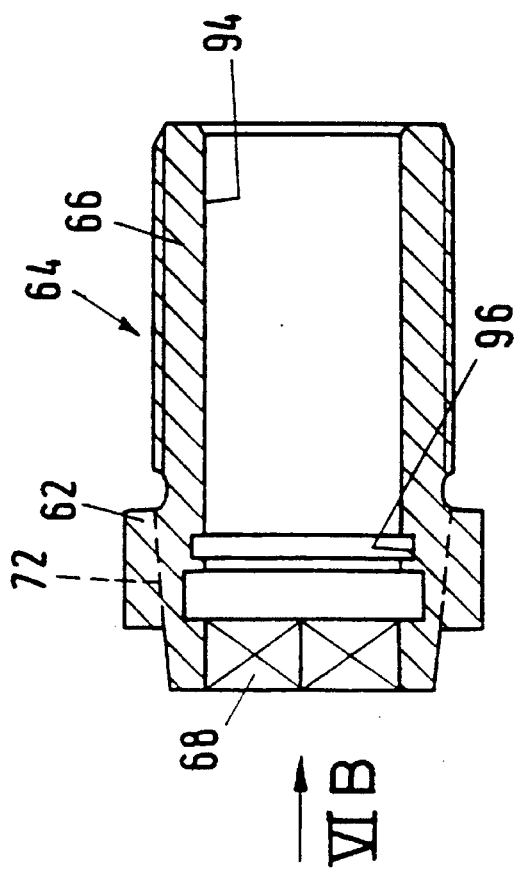

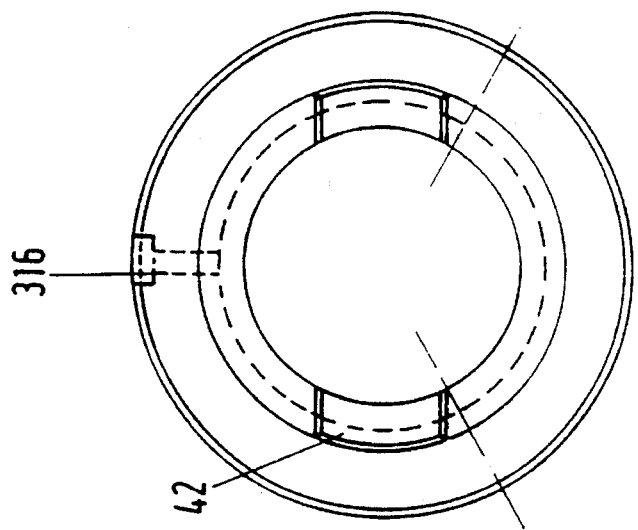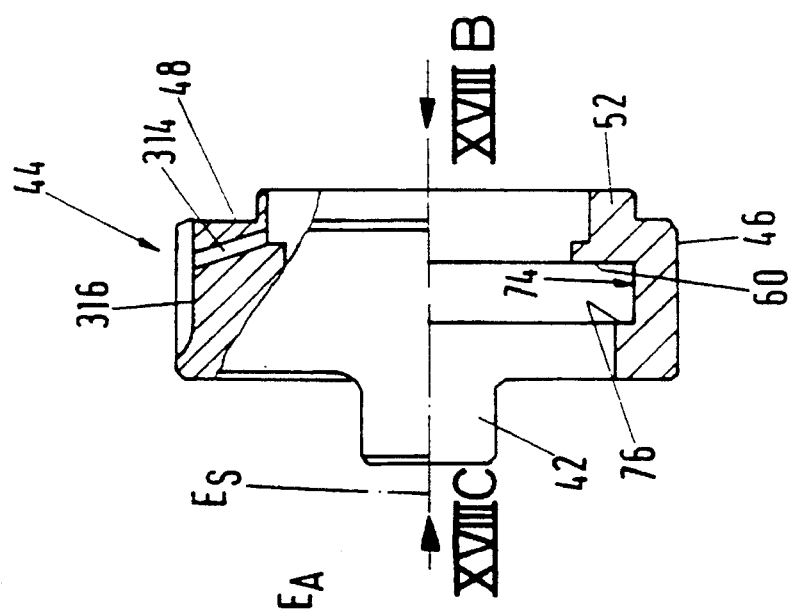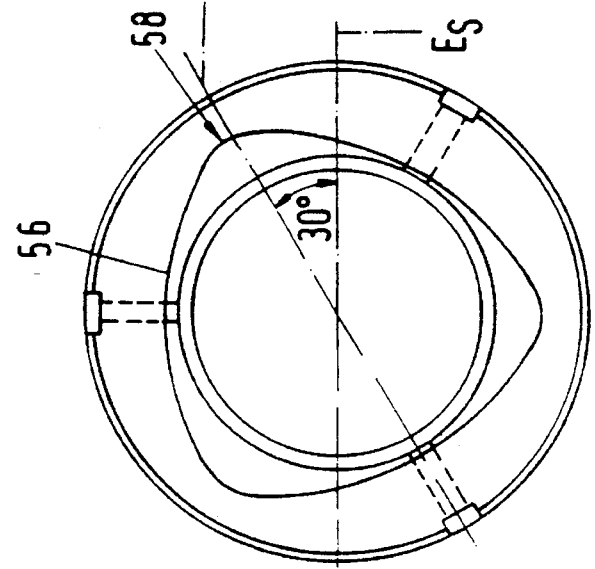

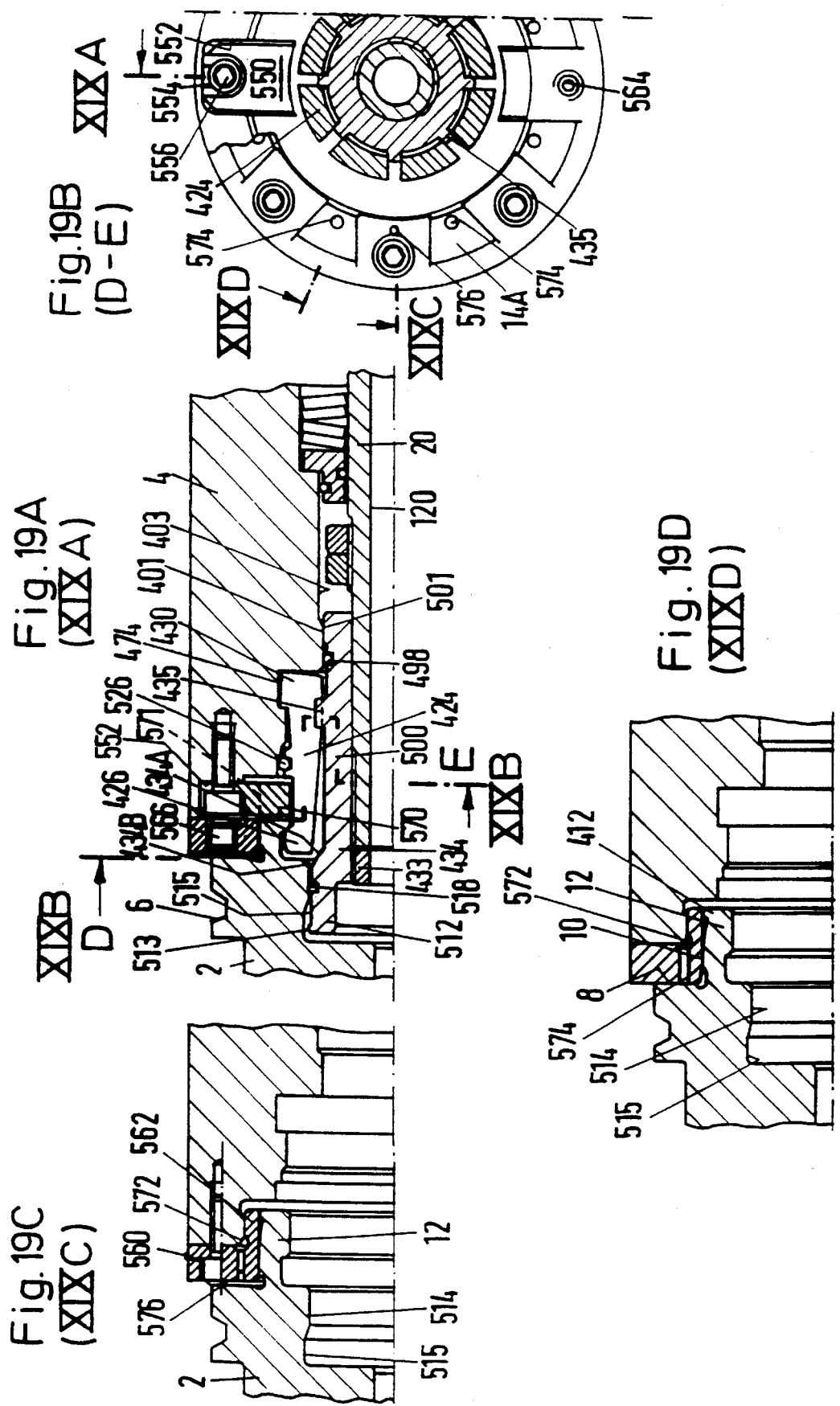

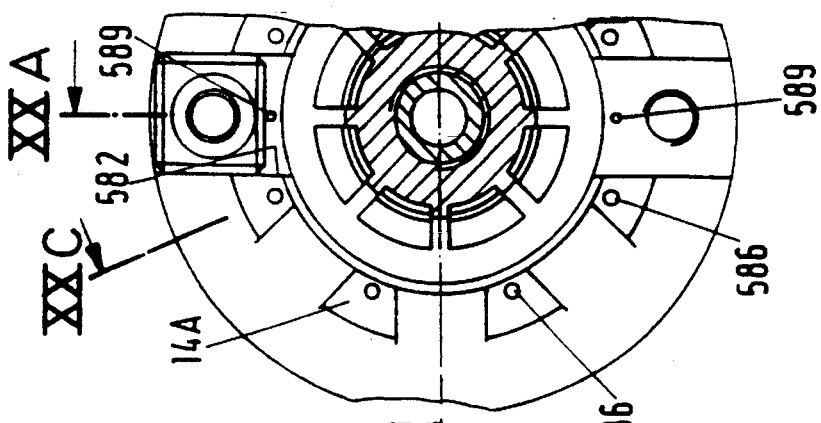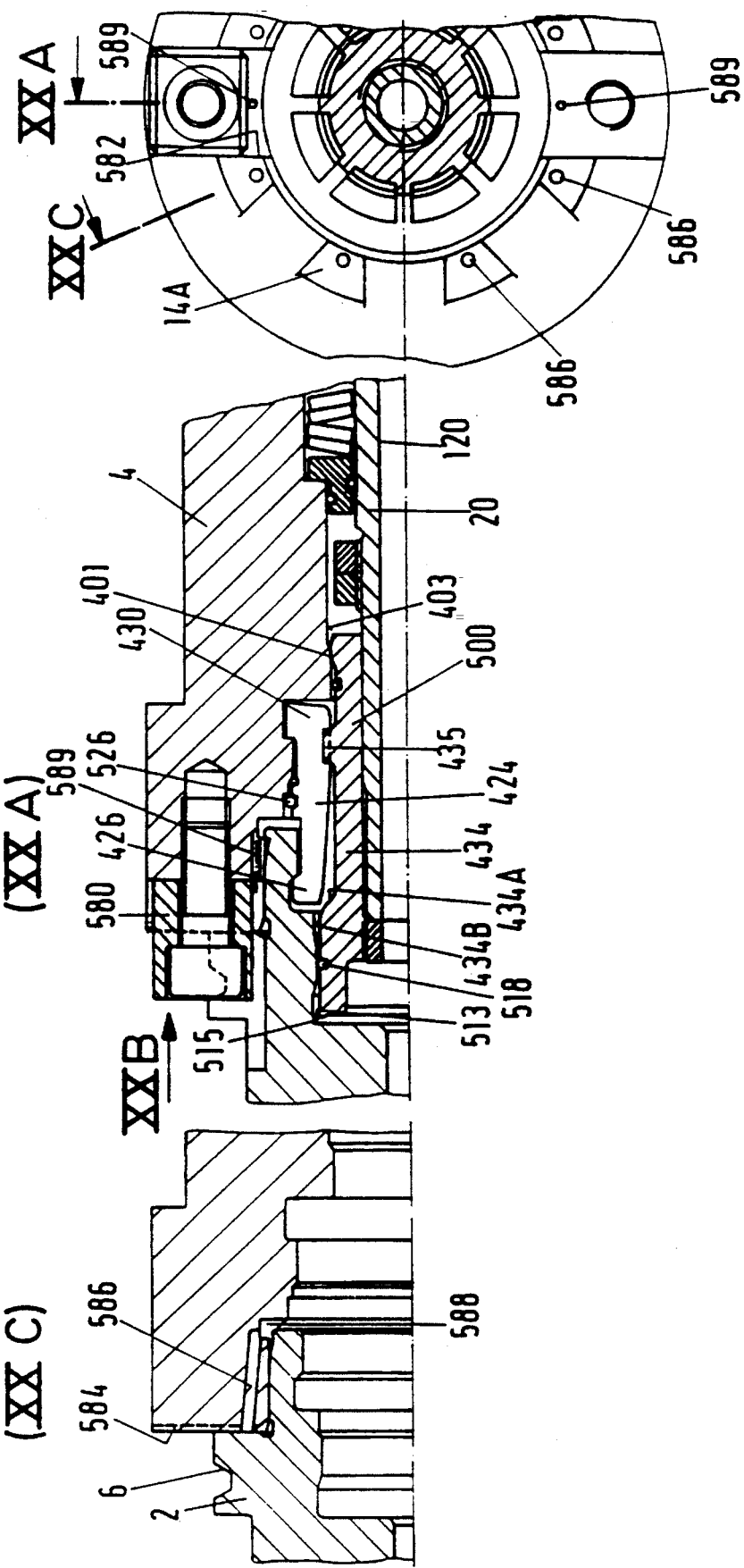

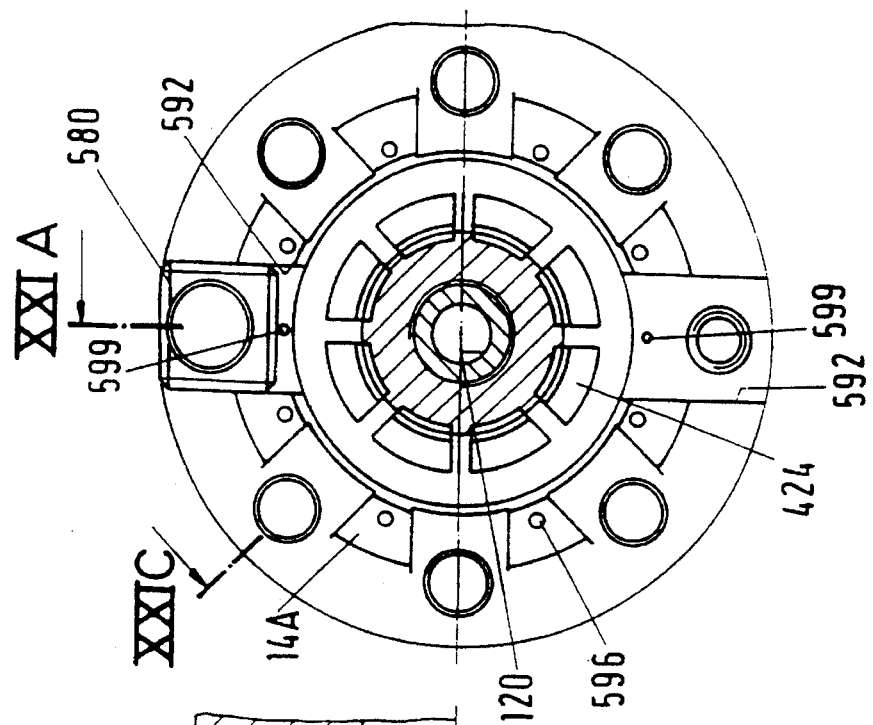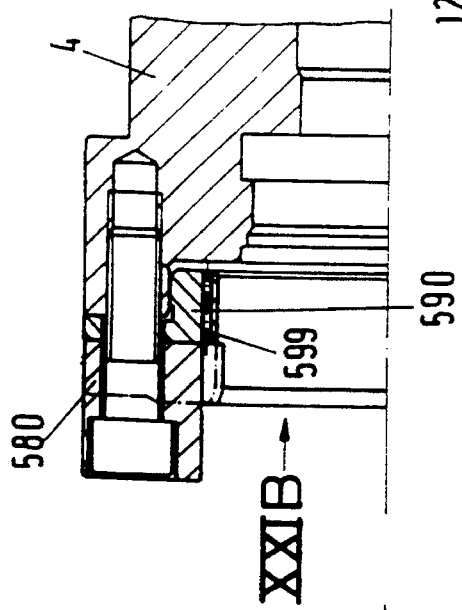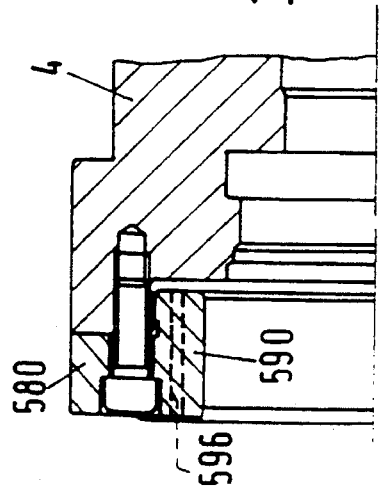

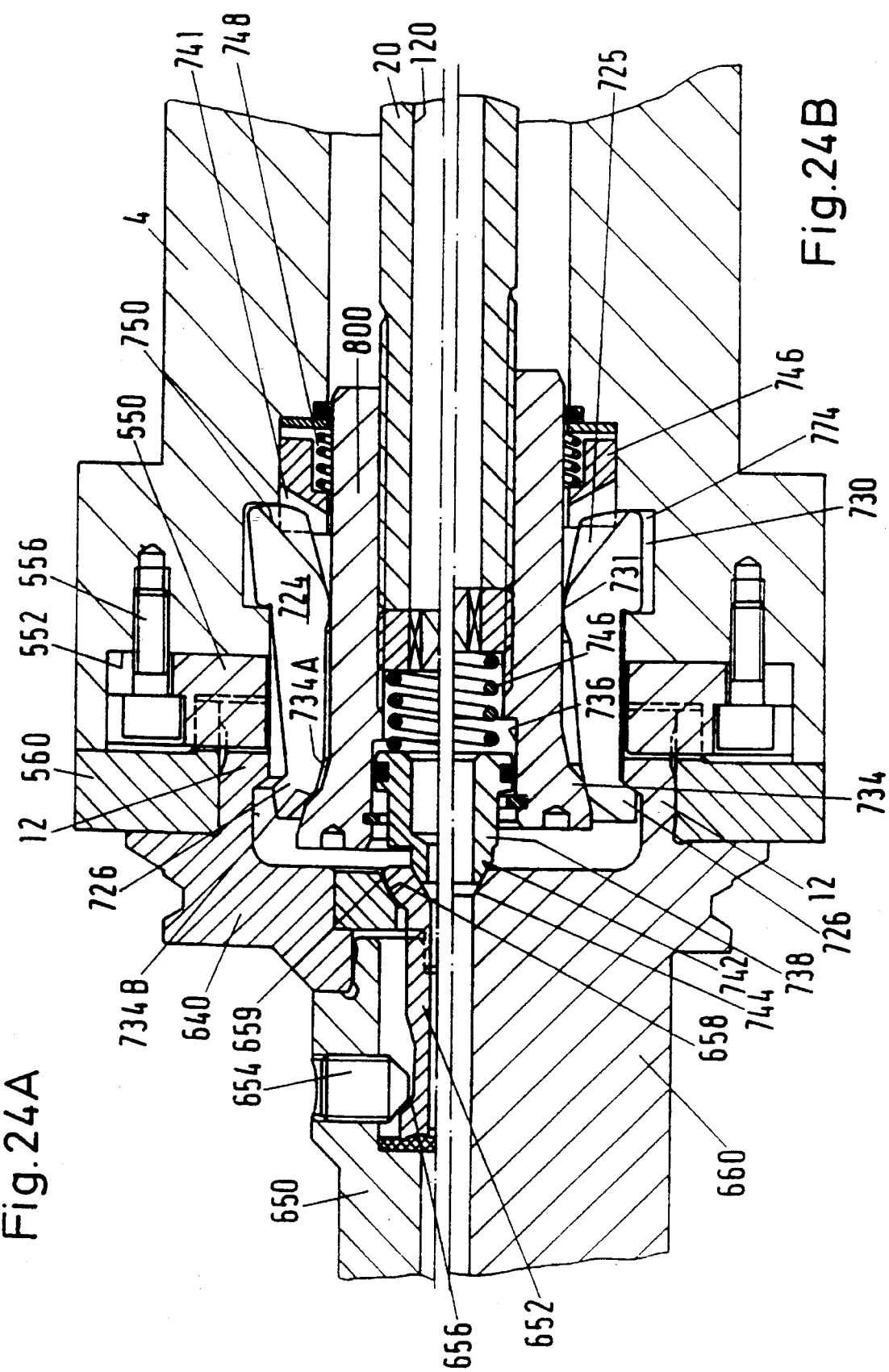

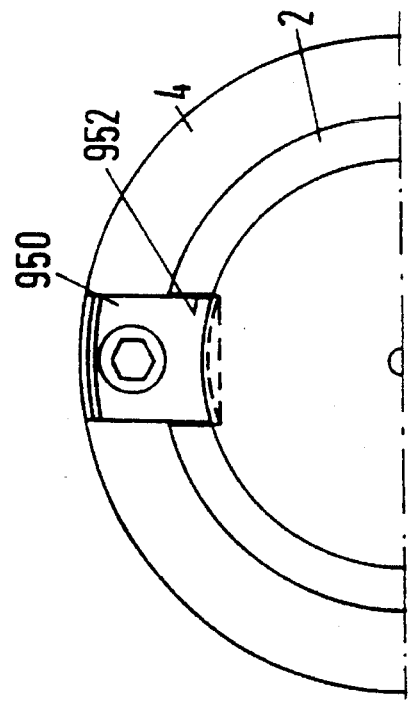
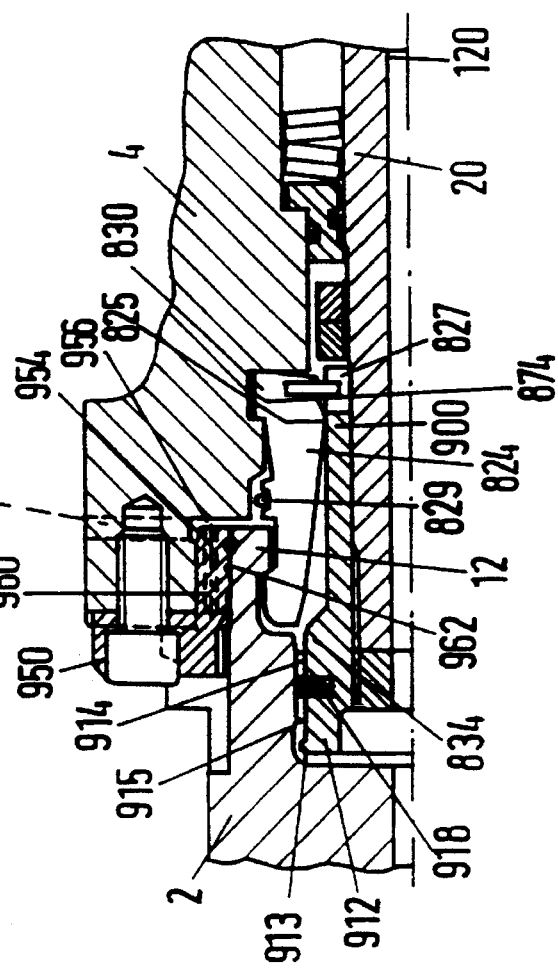
Fig. 26B
Fig. 26A

COUPLING DEVICE FOR A WORKPIECE OR TOOL HOLDER

This application is a continuation of application Ser. No. 07/445,834, filed Mar. 10, 1993, now U.S. Pat. No. 5,443,340, which was filed as International Application No. PCT/EP88/00412 on May 11, 1988.

The present invention relates to a coupling system between a workpiece and/or a tool carrier, such as, for example, a tool system module, for example, in the form of a tool receptacle and an associated manipulator, such as, for example, a machine tool configured, for example, as a drill, a lathe or a milling machine, according to the defining portion of patent claim 1. The coupling system shall be suitable for both fixed and moving workpiece or tool carriers, such as, for example, tool system modules.

The most recent technical developments towards automated processing centres has given rise to the need for modular tool systems, which must be changeable with the smallest possible expenditure of time.

A series of coupling systems for use between individual tool system modules have been developed and proposed, and these have been suitable for both fixed and for rotating tools- An attempt has been made to transfer these modular couplings to the point of intersection between the machine tools and tool system modules. However, in this connection it has been shown that it is difficult to so configure the coupling system that it can meet the demands for stability, positioning precision, lubrication of the tool, and the potential for automation of the tool change process.

Thus, the journal *Moderne Fertigung*, November, 1986, describes a coupling system as set out in the defining portion of patent claim 1; in this a cone that is connected to the operating rod of the clamp system forces two diametrically opposed clamp bodies radially outwards into correspondingly formed recesses in screws that are screwed radially from the outside into the spindle receptacle. The recesses in these screws, like the surfaces of the clamp bodies with which they come into contact are conical, and there is provision made for a specific shift in the axis between the cone of the screw recess and the cone of the clamp body, so that when the clamp bodies are forced radially outwards an axially directed contact force is generated between the elements that are to be coupled. When this is done, support is effected over a relatively large radial plane surface, which results in a relatively high degree of rigidity in the system. However, not all of these plane surfaces can be used to transfer the pressure force, because driver pins that are normal to these plane surfaces must be provided; because these ensure indexing of the tool system module relative to the machine tool or driving of the tool system module by means of the coupling element on the machine tool side, such as, for example, the spindle. In order to remedy the problem that a relatively cool tool system module can be connected to an already preheated coupling part on the machine tool side without constraint, it is an advantage if the tool system module has an engagement extension and the coupling element on the machine tool side has a recess specifically provided for this. In the known case this advantage must be obtained at the expense of the disadvantage that the tool system module must be provided with the relatively complex mechanism that includes the wedge drive, an operating rod, and the two clamp bodies.

In order to avoid this relatively large expense, it has already been proposed that this known coupling system be kinematically reversed, i.e., the clamping elements together with the operating rod and the wedge drive be moved to the machine-tool side. However, in the known case, this leads to the fact that now a centering journal must be incorporated in the machine tool side element of the coupling system. Because of this, however, a precise and accurate inside surface must be prepared on the side of the tool system module, which leads to relatively high costs. Furthermore, this system reversal means that when a tool system module is installed which is at a lower temperature than the already preheated machine tool spindle, there can be clearance problems, in which regard it must be borne in mind that for reasons of positioning accuracy, relatively close tolerances must be respected.

Furthermore, it has also been shown that the rigidity of the point of intersection between the tool and the machine tool is restricted in that the bending resistance moment of the coupling system in the area of the point of intersection is only defined in the plane that contains the axes of the clamping bodies and the screws. In the case of rotating loads, this means that the coupling system is not able to counteract the buildup of oscillations in the tool.

For this reason, it is the aim of the present invention to create a coupling system as set out in the defining portion of patent claim 1 and which can meet the demands with respect to positioning accuracy of the workpiece or tool carrier, such as, for example, the tool system module, stiffness of the connection, potential for automation of the workpiece or tool changeover, flexibility with regard to fields of application, and economy to an improved degree. This task has been solved by the features set out in the descriptive portion of patent claim 1.

According to the present invention this has been achieved by creating a clamp-like bracing between the elements that are to be coupled, to improve the flow of force between the coupling elements, i.e., to make this as even as possible around the point of intersection between the tool system module and the machine tool. Because of the homogenous distribution force around the periphery, in conjunction with the configuration of the clamp claws according to the present invention, in the form of essentially axial oriented clamp-like elements, the installed space required for the clamp claws in a radial direction is very small, which also presents the possibility of making the plane surfaces of the coupling parts that are in surface contact with each other very large. Furthermore, because of the configuration of the coupling system according to the present invention there is no need for moving any moving part in the proximity of the axis, there is compatibility with the most varied tool systems, for example, those in which a modular coupling is built with axial attachment screws. As was previously the case, steps have been taken to ensure that temperature-related difficulties encountered when changing the tool system module have been excluded from the basic concept, since the colder tool system module engages with an extension in a recess. The relatively more costly precision inside surface is thus formed in the area of the machine tool side part, which means that the cost of the tool system module have been reduced. This results in the particular advantage that there are no longer any moving parts in the tool system module, which means that production costs can be greatly reduced.

The above-described advantages result for each type of a coupling between the workpiece or tool carrier and a manipulator system, which can be configured, for example, from a workpiece changeover system.

The construction of the coupling system according to the present invention thus entails in particular advantages if it is used in the area of the point of intersection between a machine tool spindle and a tool receptacle as set out in patent claim 1. In this case, this results in an extremely simple spindle construction, since all the parts can be formed so as to be rotationally symmetrical. An added advantage is also the fact that spindles of machine tools that are already commercially available can be converted at very little cost to the coupling system according to the present invention, whereby the connecting rod that is already provided in the spindle can still be used and all that is needed is the configuration of a front flange on the spindle to accommodate the clamping claws. In this regard, as was previously the case, the working travel required to release the coupling system has been greatly reduced vis-a-vis the conventional coupling system with a quick release. Since only a plane surface and a centering extension have to be considered on the tool system module side, it is also possible to provide standardized gripper flutes for an automatic tool changeover system, which results in a further advantage from the point of view of economy, when the advantages of the cylinder fit with regard to positioning accuracy can be retained as before.

The rotationally symmetrical configuration of the coupling system also makes it possible, in an advantageous manner, to transfer the contact force without any lateral force, and thereby enhance the positioning precision and also the stability of the tool. Under the action of the wedge drive the clamp-like clamping claws fit snuggly to a slope in the groove-like recess of the centering extension whereby, because of a suitable configuration of the surfaces of the wedge drive that are in contact, such as, for example, by the development as set out in patent claim 1, the clamping force can be initiated with the lowest possible loss. In this regard, it is a further advantage that the slight elastic deformation of the centering extension brought about by the clamp claws being forced outwards tends to configure the fit between the spindle and the tool system module more precisely, i.e., to improve this fit.

The generation of the axial contact force so as to be free of lateral force is additionally enhanced by the development set out in patent claim 1. In this manner, a floating support for the operating rod is created, whereby the thrust cone undergoes a self-centering action radially within the clamping claws when the force is initiated. The ends of the clamping claws that are remote from their clamp section rest in a radially defined position in the recess, so that a positive drive is created, with which the contact force can be generated extremely evenly about the periphery.

If the thrust cone is arranged radially within the claw sections, this results in the immediate initiation or introduction of the conical force onto the claw sections, which means that a transfer of force can take place through the wedge surfaces of the wedge drive. According to the present invention a further stage in this transfer of force is generated by the claw sections pivoting into the groove-like recess in the centering extension, so that very high axial clamping forces can be applied. The coupling system according to the present invention is thus suitable for use at the points of intersection of nearly all types of machine tools.

Fundamentally, it is also possible to secure the clamp claws in any place within this centering recess of the spindle, so that they can be moved into and out of engagement with the groove-like recess of the centering extension whilst maintaining a predetermined radial position. However, the development as set out in patent claim 1 is particularly advantageous; according to this a supporting groove for the clamp claws is configured in a driver ring that is inserted in the centering recess.

The advantage that is obtained by the development as set out in patent claim 1, to initiate the forces that are generated during the transfer of torque in a defined manner with the assistance of at least one driver claw that engages in a recess in the face of the centering cylinder and thus leave the plane surface contact between the elements that are to be coupled undisturbed is maintained by the development as set out in patent claim 1. In addition, this entails an advantage from the point of view of production technology, in that the functional surfaces for the pivoting motion of the clamp claws and for the peripheral transmission of forces can now be configured on a single component and can thus be produced with greater precision with regard to their positions relative to each other.

As has been discussed in the introduction hereto, the configuration of the coupling system according to the present invention results in a purely rotationally symmetrical construction that requires no components in the vicinity of the axis. In an advantageous manner, this opens up the possibility of supplying the tool system module with cooling or lubricating agents for the tool through axially centered supply channels. All that is required to do this is that the operating rod incorporate a longitudinal drilling for the lubricating agent. This lubricating agent is then passed through the interior of the thrust cone and through a hollow journal as set out in patent claim 1 and onto a coaxial recess in the tool system module.

In this connection, it is possible, to provide an axial centre drilling in the thrust cone, in which a hollow journal that is secured so as to be sealed within the work system module can engage. In this manner, the lubricating agent feed can be effected without any radial diversions, although additional steps are also taken to ensure that the path of movement when the coupling system is released remains restricted to the axial longitudinal dimension of the centering cylinder.

A particularly advantageous configuration of the groove-like recess within the centering extension or the centering cylinder results when the groove-like recess is formed from a V-section annular groove since this groove can be produced by plunge cutting.

The construction of the coupling system according to the present invention makes it possible to so configure the functional surfaces between the clamp claws, the receptacle cylinder and the centering cylinder in such a manner as to provide the greatest possible contact area. This can be ensured in that the clamp claws are configured or produced, respectively, by the radial separation of a sleeve-like body (78), which forms annular beads which has an annular ring (26; 30) that projects radially outwards on its face.

If a centering ring as set out in patent claim 1 is provided, the rotation can be made additionally adjustable which results in a further enhancement of the positioning accuracy of the tool system module.

In a coupling system according to the present invention a homogenous distribution force about the periphery and a precise positioning of the elements that are to be coupled relative to each other are dependent on the state of the functional surfaces of the elements that are to be coupled, and which are to be brought into precise engagement with each other. For this reason, it is advantageous to keep these functional surfaces as clean as possible when the coupling system itself is used under demanding conditions, i.e., during the greatest possible chip production and even during unfavourable chip formation, and thereby keep the necessary systems expenditure as small as possible. This requirement is taken into account by the development of patent claim 1. When the coupling is released the functional surfaces of the elements of the coupling system that are to be brought into engagement with each other are preferably flushed continuously with compressed air, so that dirt, grinding dust, and the like cannot adhere to the precision surfaces. For this reason, damage to the precision surfaces can be effectively precluded, so that the service life of the coupling system can be greatly increased.

With the rotationally symmetrical structure of the coupling system, it becomes simpler to supply the flushing channel system with compressed air. In order to clean the plane surface contact between the tool system module and the spindle effectively, the development as set out in patent claim 1 is of particular advantage. The compressed air flushing channels in the radial annular surface segments ensure that when the tool system module approaches the precision surfaces an ever more strongly accelerated flow of compressed air is generated between the precision surfaces that are moved towards each other which means that even the finest grinding dust is removed from said precision surfaces. The gooves between the radial annular surface segments also act as dirt traps, which further simplifies the problem of keeping the precision surfaces clean.

It is also of advantage from the point of view of production technology, if the supporting groove is formed in a driver ring inserted in the centering recess, that transfers peripheral forces onto the tool system module, or the centering recess turns into a radial shoulder in a depression in which a suitably formed driver extension of the driver ring engages positively so as to create a non-rotating connection between the machine tool spindle and the driver ring, respectively, since in this manner all that is required is axial processing of the part on the side of the machine tool, for example, the machine tool spindle.

It has been shown that because of the prism-like configuration of the drive extension very large peripheral forces can be transmitted on the driver ring, in which connection the effective diameter of the driver extension can be kept relatively small. Basically, any regular polygonal cross section can be used for the configuration of the driver extension. However, it has been shown that good results can be achieved with edges that are ground round and convexly curved prismatic surfaces. This results in a positive connection in the form of a so-called K-profile, although the flat planes provided between the rounded edges can be replaced by convex surfaces.

If the driver ring supports two diametrically opposed driver claws, of which the plane of symmetry subtends an angle of 30° with one of the three axial planes through the edges of the driver extension, this increases the use-value of the coupling system according to the present invention. Using this configuration, it not only becomes possible to transmit the peripheral forces that occur during the transmission of torque in a symmetrical manner, but, in addition, this creates the conditions so that the work system module can be indexed relative to the machine tool in increments of 30° each.

The development according to patent claim 1 is also advantageous to provide for additional stabilization of the clamping claws. In the development as set out the guide cylinder also assumes the function of fixing the drive ring definitively with the centering recess, which means that the number of constructional elements can be reduced.

In the development according to patent claim 1, because of the configuration of the annular space that is supplied with compressed air, the compressed air which is available is passed with a lower loss level to the important points which are to be kept clean or to be cleaned. This development is of particular advantage, if the guide body in the area of the thread has at least one notch that extends essentially in an axial direction, for supplying the annular space for the compressed air, since in this manner it is possible to keep the amount of compressed air flowing through the side cuts large enough that not onyl the plance surfaces, but also the cylindrical precision inside surface are either flushed or cleaned, respectively.

This development is particularly simple from the point of view of production technology, since the notch in the area of the thread is very simple to produce.

With the development as set out in patent claim 15 simple means are used to ensure that a specific flow of compressed air is fed to the functional surfaces between the thrust cone and the clamping claws.

In a very simple manner, the configuration of the guide cylinder as set out in patent claim 1 creates the conditions for the above-discussed floating support of the operating rod in the area of the wedge drive, which means that the self-centering effect is brought about, and which at the same time means that the coupling process itself is not made any more difficult, since the elastic sealing ring ensures sufficient precentering of the coupling elements. If the compressed air flushing channels are configured in the centering ring, this results in a very cost-effective provision of the flushing channel system, since the compressed air flushing channels can be accommodated in a separate constructional element. This results in the additional advantage that because of the use of the centering ring that is only in contact with the spindle on one plane surface and on one cylindrical precision surface for its statistically determined mounting the spindle, only one annular space results on the rear side of the centering ring, through which the compressed air can be distributed equally to the individual flushing channels. The development according to patent claim 1, particularly if the longitudinal grooves in the driver ring emerge radially within the annular space and become an annular gap that is open to the cylindrical presision surface, this being preferably a peripheral annular gap, is additionally advantageous. The annular gap to clean the cylindrical precision surface between the spindle and the tool system module can be produced very simply in that a suitable diameter determination of the driver ring and of the centering ring will result.

If at least one longitudinal notch and the intermediate space between the draw bar and the guide body extend from a common compressed air supply chamber that is supplied with compressed air through an annular channel between the draw bar and the spindle, this results in the possibility of a very simple central compressed air supply for the flushing channel system.

If the claw section has on its outer side a wedge slope that falls way to the tool system module, the construction of the coupling system can be additionally simplified. The wedge slope that drops off towards the tool system module means that the centering cylinder forces the claw sections radially inwards on introduction into the machine tool recess.

An additional advantage of the above-described coupling system can also be seen in the fact that using only one single point of intersection it is possible to provide for a reduction in the diameters, i.e., transitions from one relatively large spindle diameter to a relatively small diameter of the tool system module, without enlarging the axial installed length. To this end, all that is required is to insert a suitably shaped reducer ring into the centering recess and provide clamp claws that are correspondingly curved radially inwards, which can then be brought into functional engagement with an optionally modified thrust cone.

It has been shown that particularly good results can be achieved with six or eight clamping claws.

With the development as set out in patent claim 1 it is possible to reduce construction costs.

When the supporting groove is defined by a machine tool spindle with a front flange, this development provides the possibility to configure particularly heavily loaded areas of the supporting groove within the front flange, which is installed so as to be removeable on the machine tool side coupling element, for example, on the machine tool spindle.

The front flange can, like the above-discussed centering ring, be configured entirely from wear-resistant materials, or can have inserts of this same material, in order to increase its service life.

Advantageous variations of the configuration of the drive in the peripheral ring between the elements of the coupling system that are to be joined together are achieved if at least two preferably diametrically opposing driver claws are provided for the drive between the elements that are to be coupled, it being possible to bring these into precision functional engagement with suitably configured recesses in the other coupling element.

In order to simplify the installation of the tool system module, a precentering system for the elements of the tool system module that are to be joined together is to be provided. A simple form of this precentering is the object of patent claim 1.

If the precentering system has a pair of outer surfaces of a cone section that is connected with the operating rod, said surfaces being axially separated, in which connection the outer surface that is remote from the tool system module can be brought exclusively into engagement with an inner recess of the machine tool spindle if the operating rod is in a position that releases the coupling, and whereby the other outer surface that forms the centering aid remains out of engagement with an inner cylinder surface of the tool system module, it is possible, when moving the elements that are to be joined towards each other, i.e., when the operating rod is extended, the latter can be used for precentering the elements that are to be joined together. As a result of a suitable configuration of the counter-surfaces, which is matched to the travel of the operating rod, it is ensured that the operating rod together with the thrust cone has no more radial guidance during the clamping process, so that the thrust cone in conjunction with the clamping claws can be self-centering during the clamping process.

The development as set out in patent claim 1 leads to further simplification of the structure of the coupling system, in that the coupling extension of the thrust cone is used to provide lateral stabilization of the clamping claws.

When the radial slots are formed in a pressure body that presses against the control surface of the clamping claws through a spring system in order to pivot its claw sections out of the groove-like recess in the release state, this entails the additional advantage that when the operating rod is in the disconnected state there is a positive inwards pivoting of the claw sections, which provides the possibility, on the one hand, of configuring the slope angle in the groove-like recess on the one hand and, on the other, the interacting claw sections to the central axis of the coupling system.

Similar advantages result from the development as set out in the last alternative of patent claim 1.

Further advantageous configurations of the present invention are the object of the remaining claims.

Figure 2A:
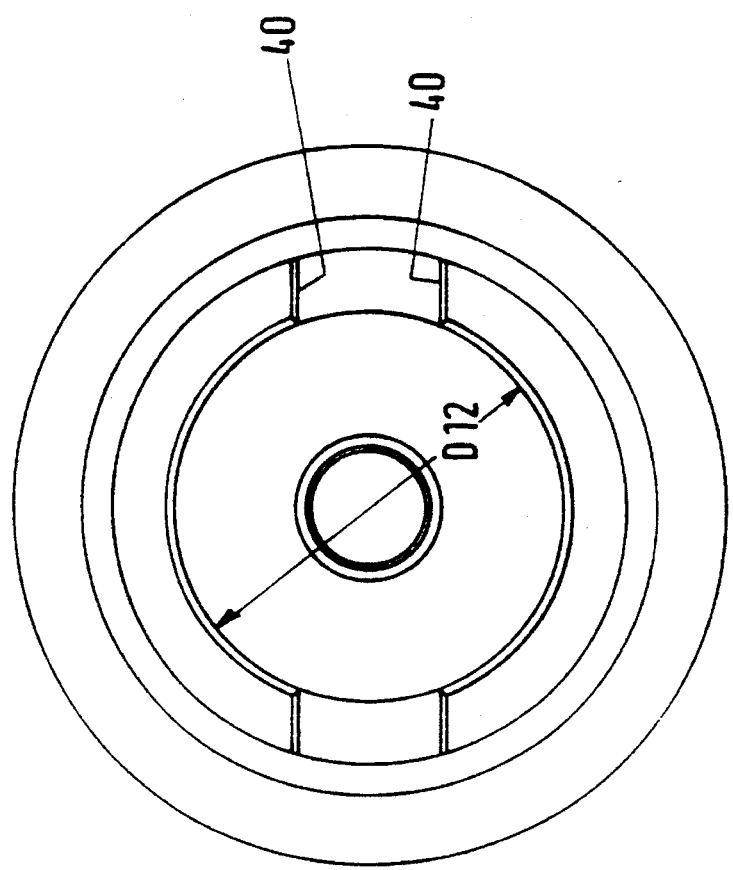
Figure 3B:
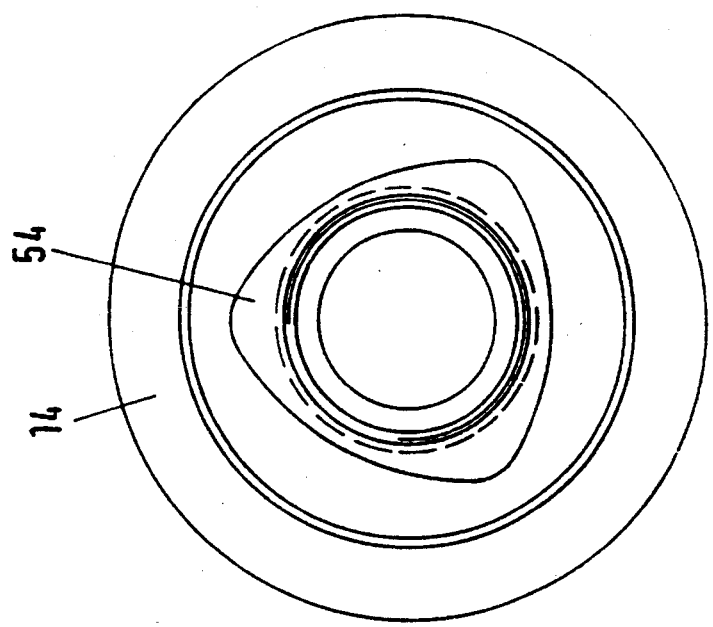
Figure 3A:
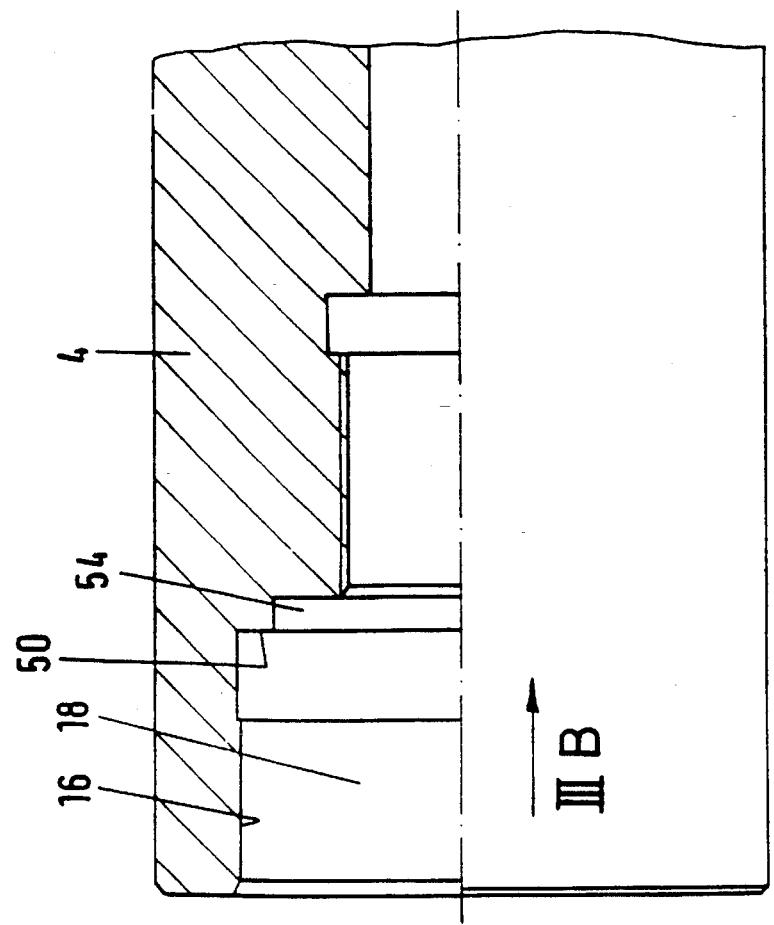
Figure 4C:
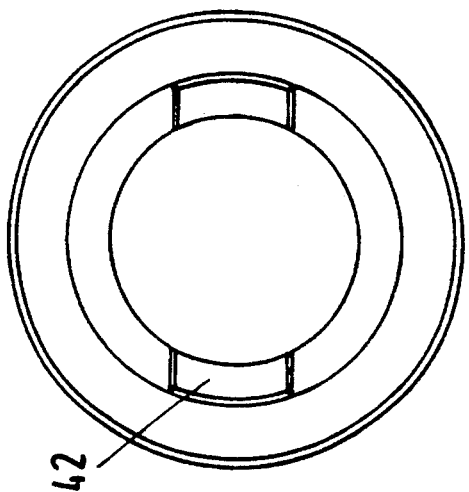
Figure 4A:
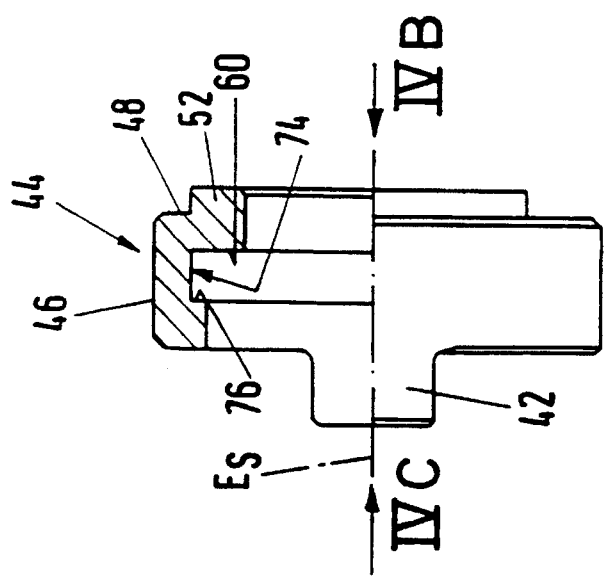
Figure 4B:
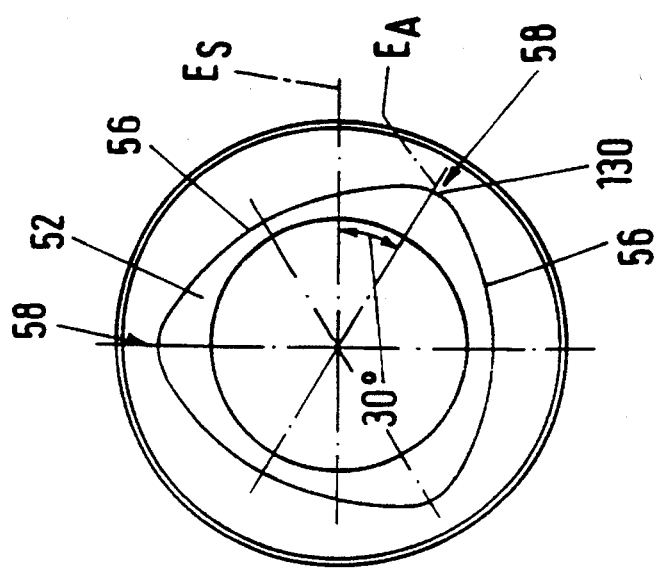
Figure 5A:
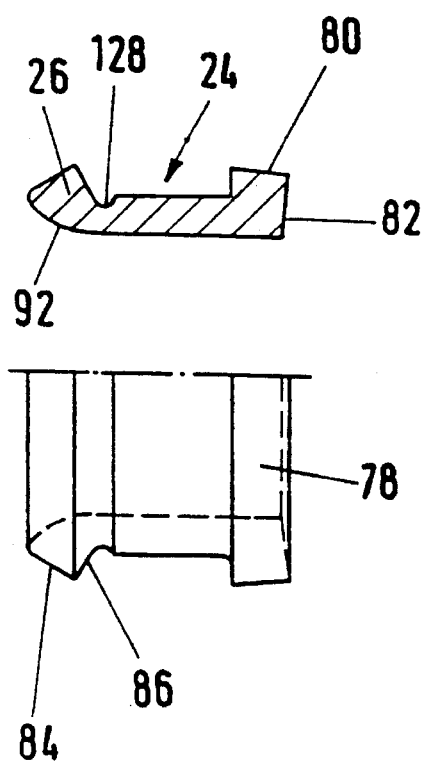
Figure 5B:
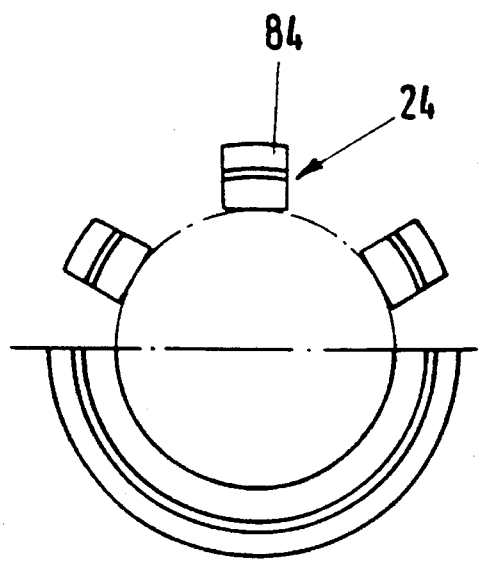
Figure 7:
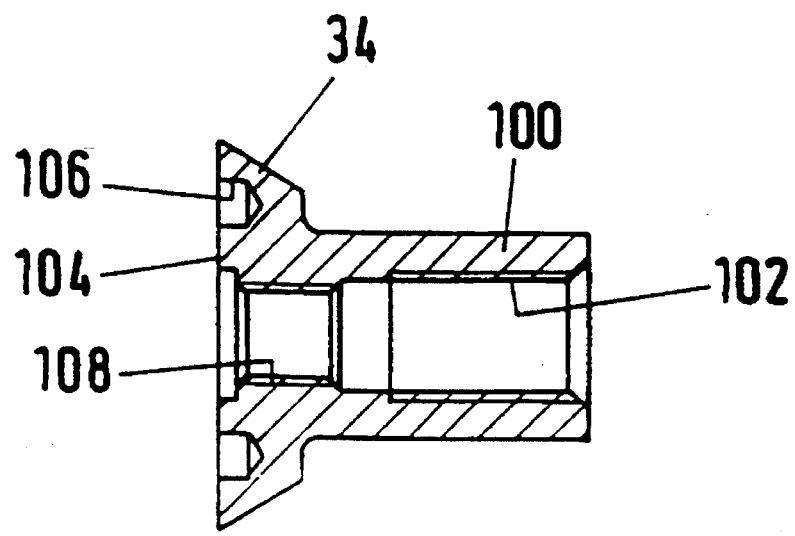
Figure 8:
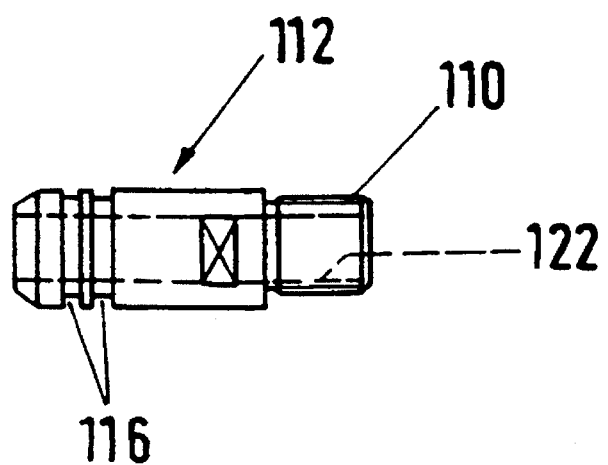
Figure 9:
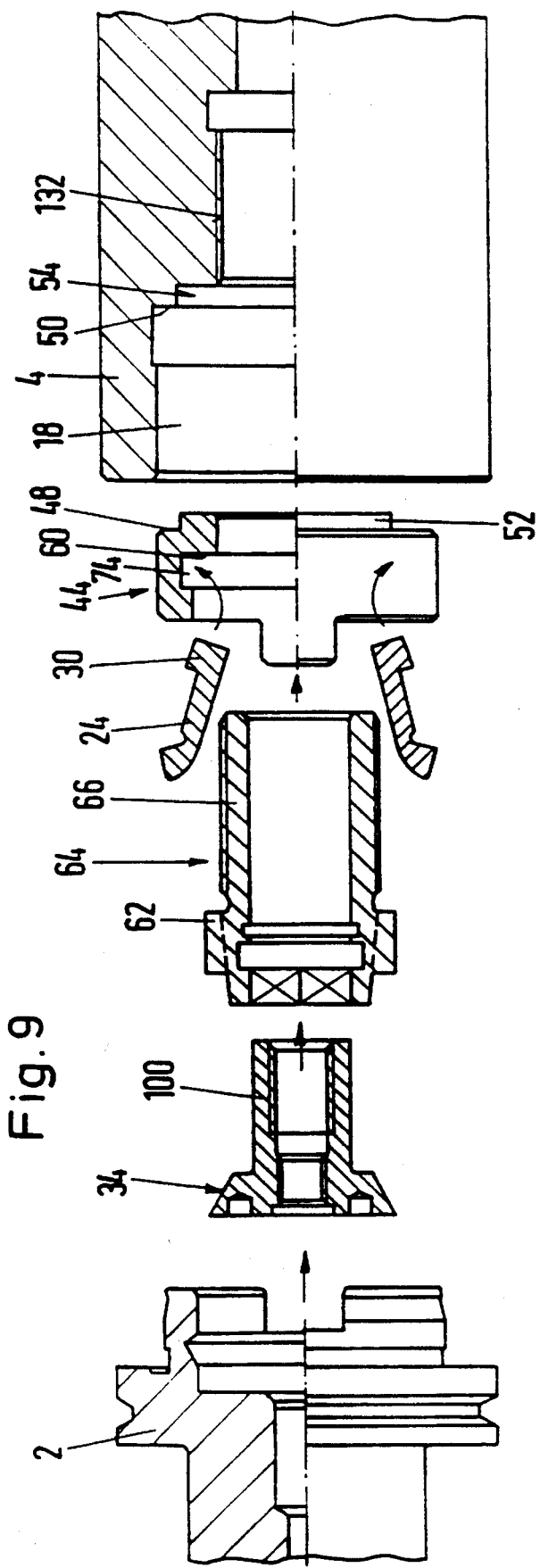
Figure 10:
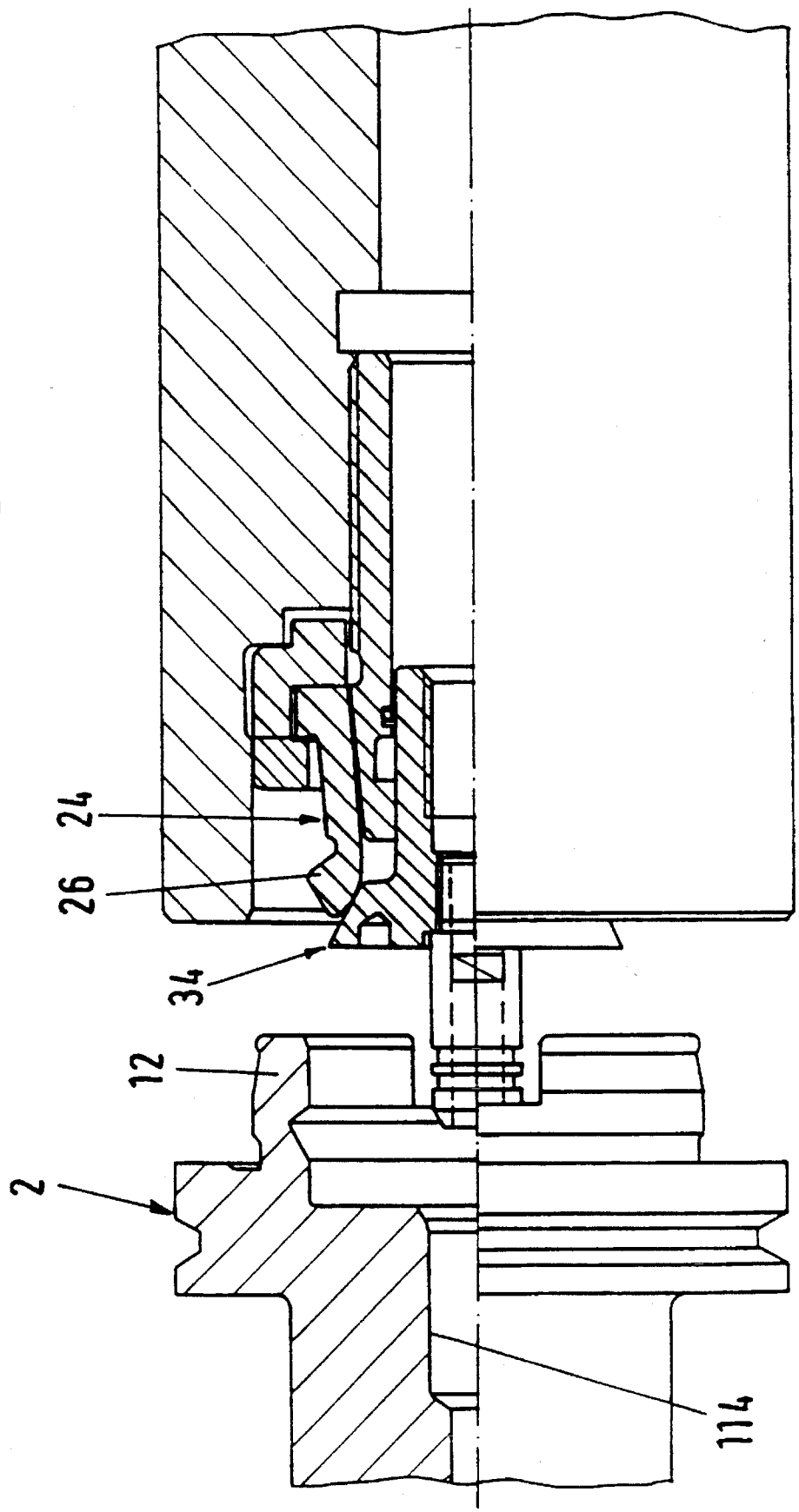
Figure 11:
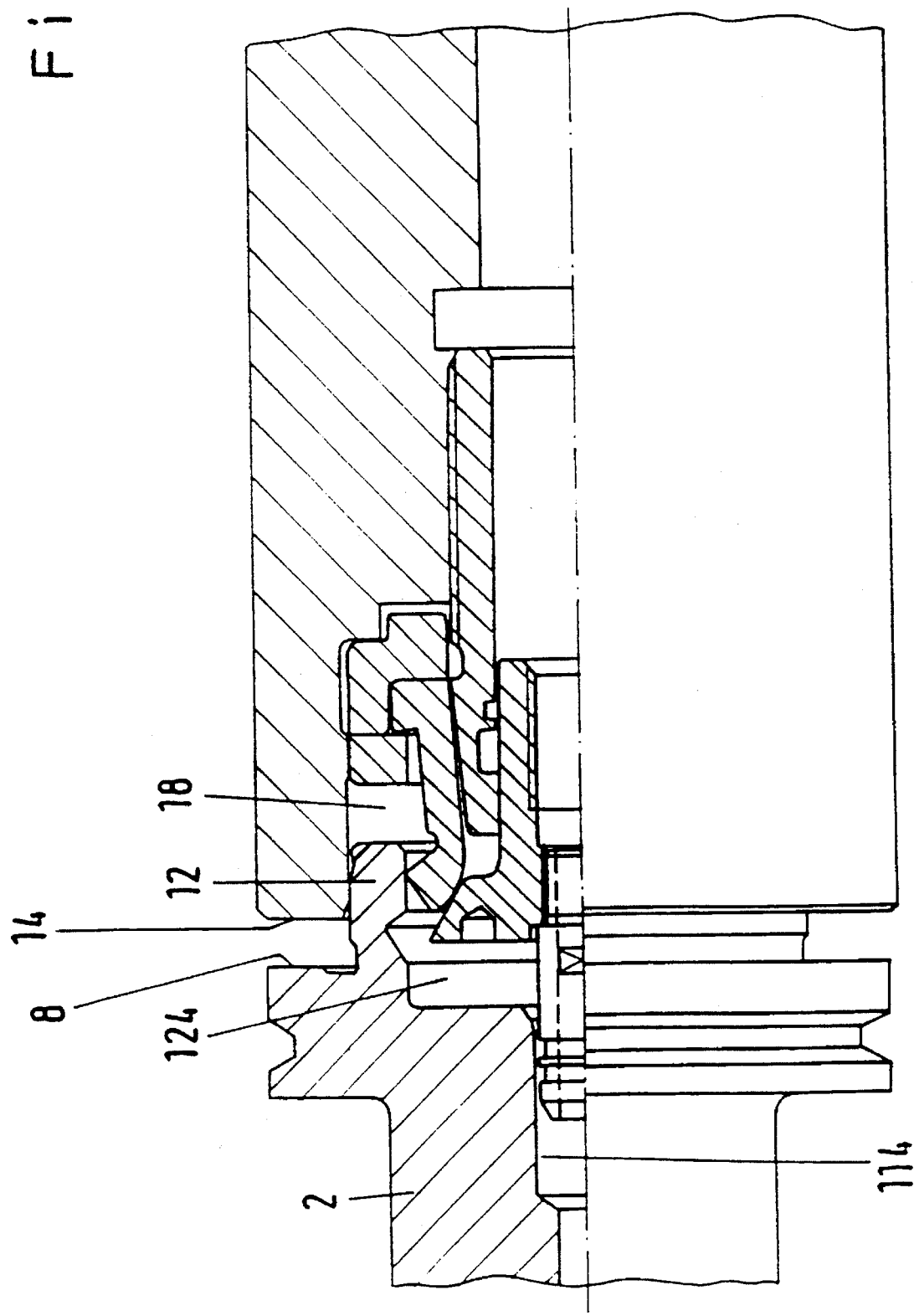
Figure 12:
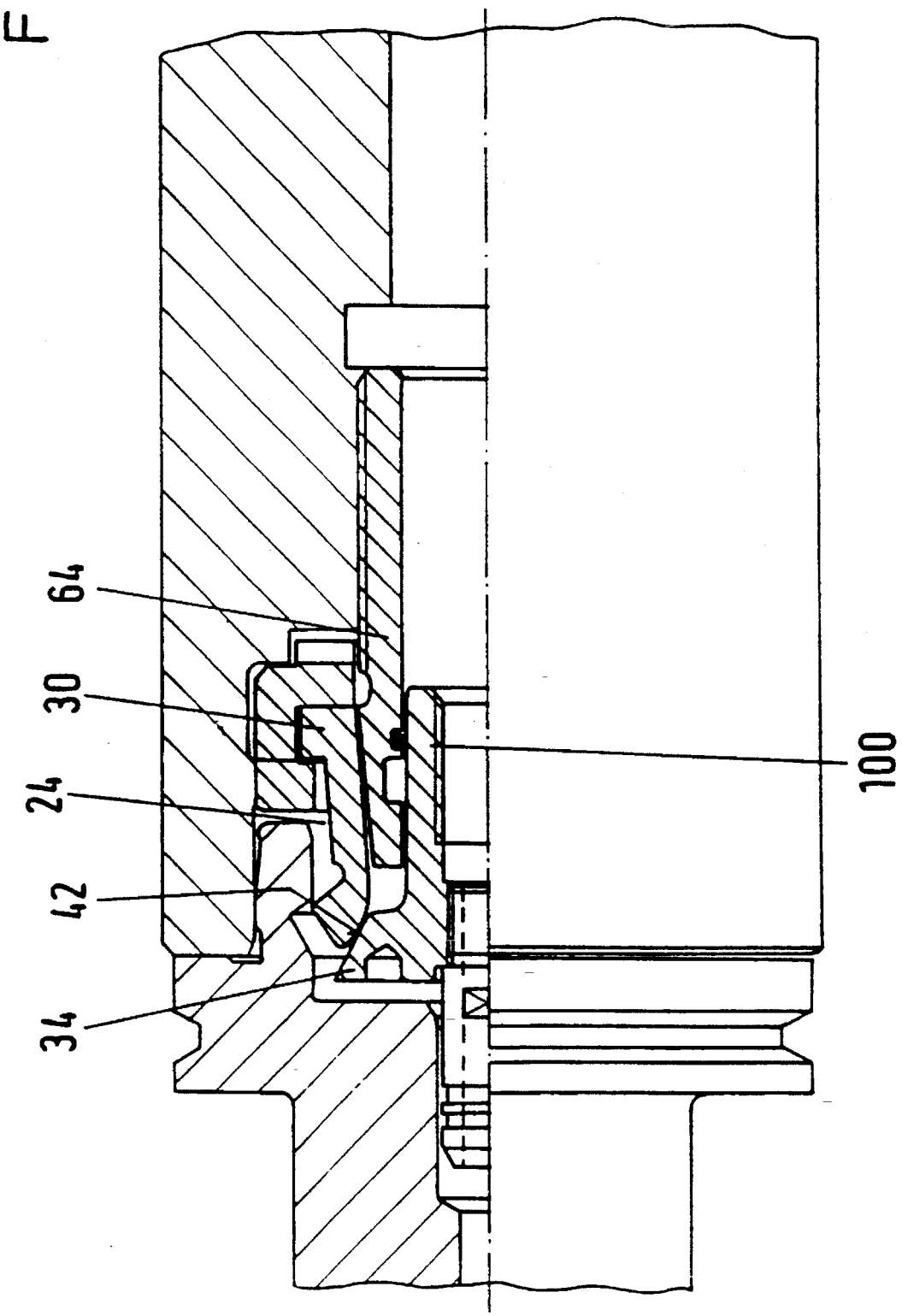
Figure 13:
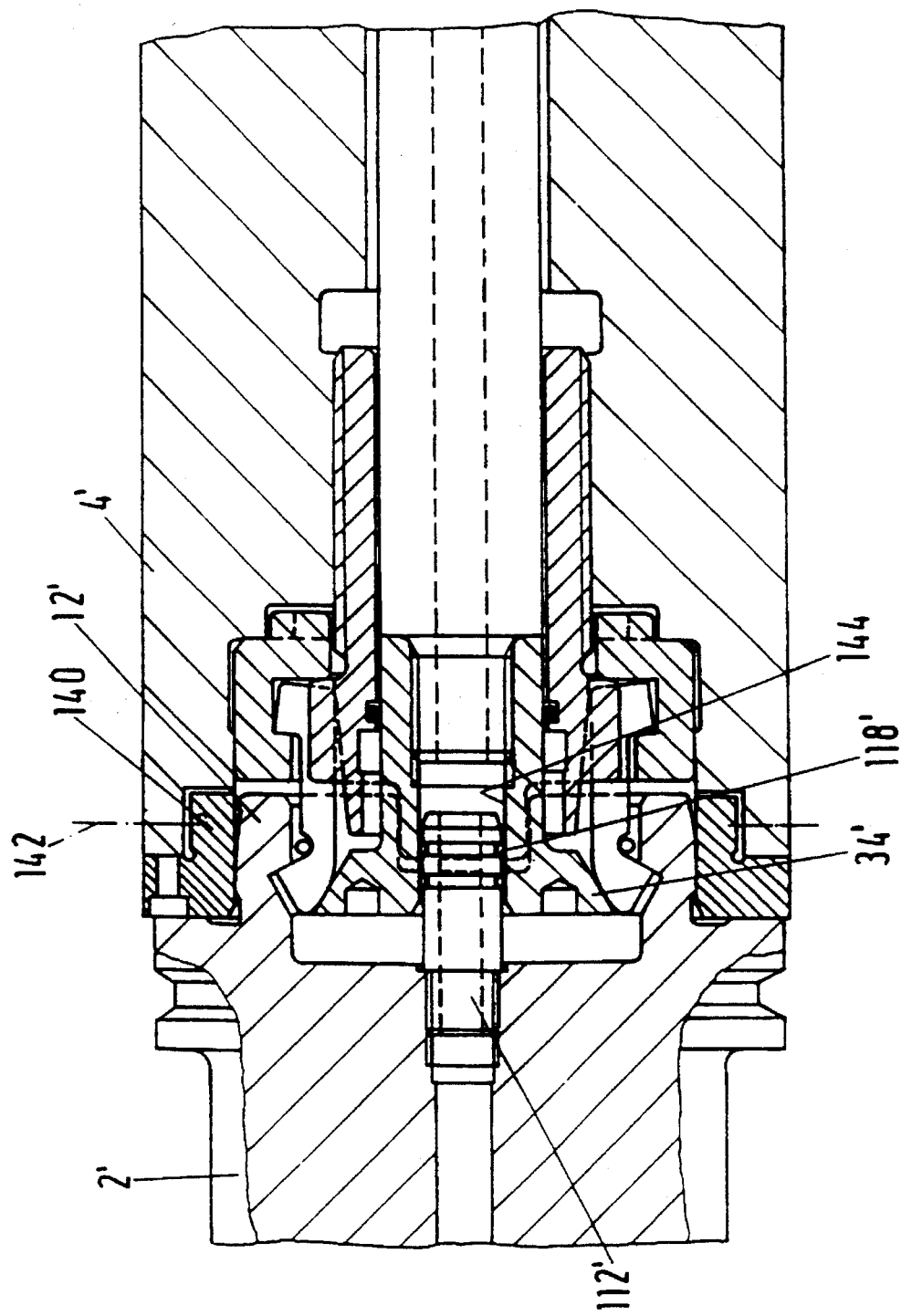
Figure 14:
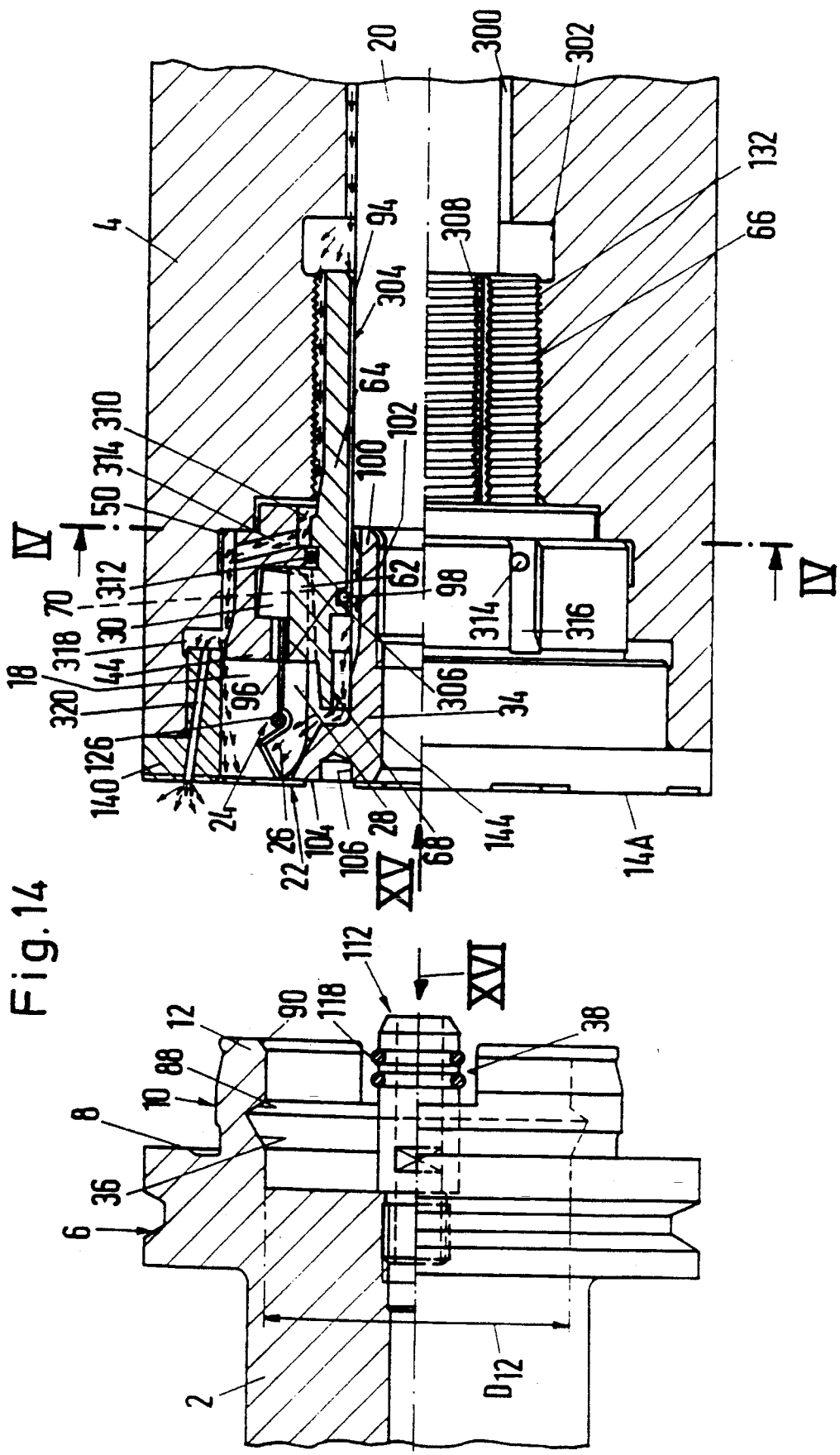
Figure 15:
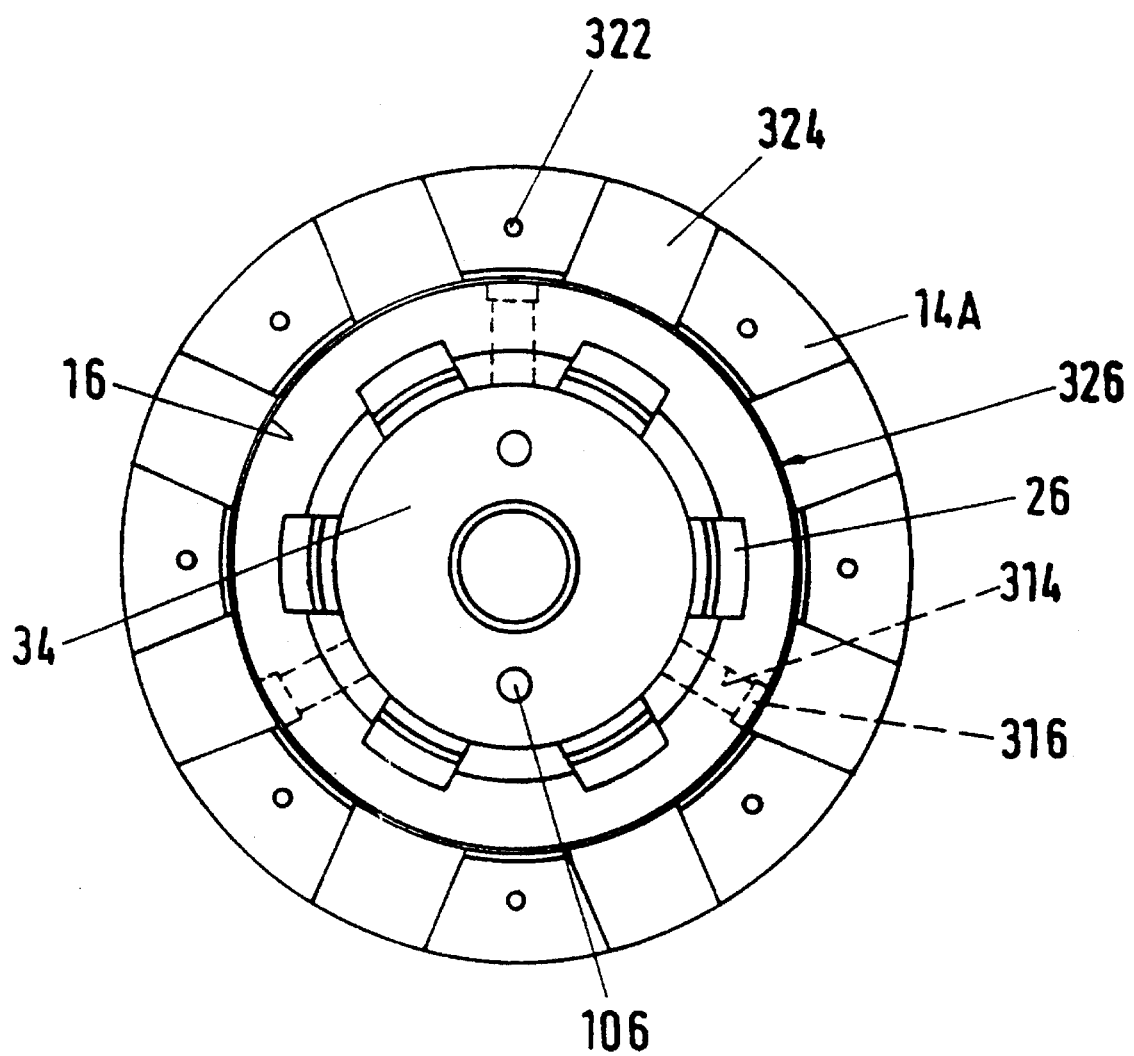
Figure 16:
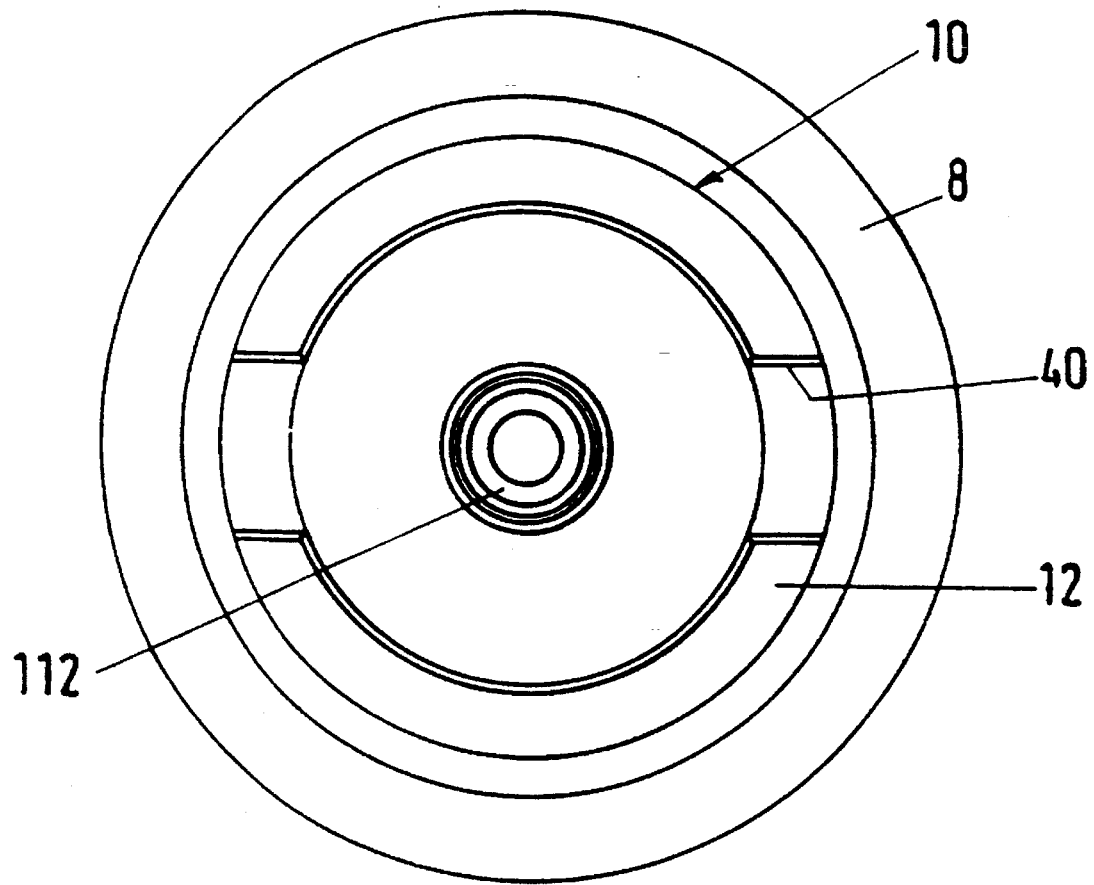
Figure 17:
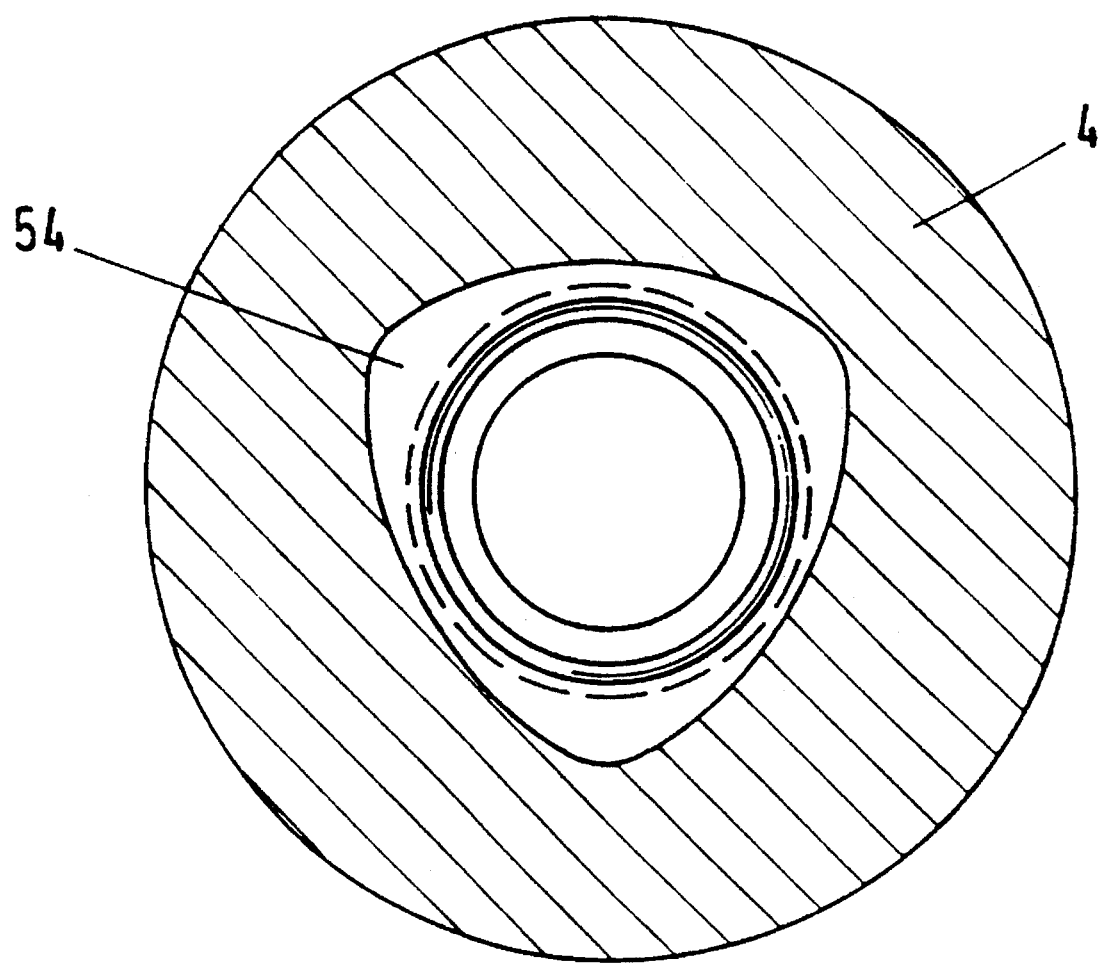
Figure 22A:
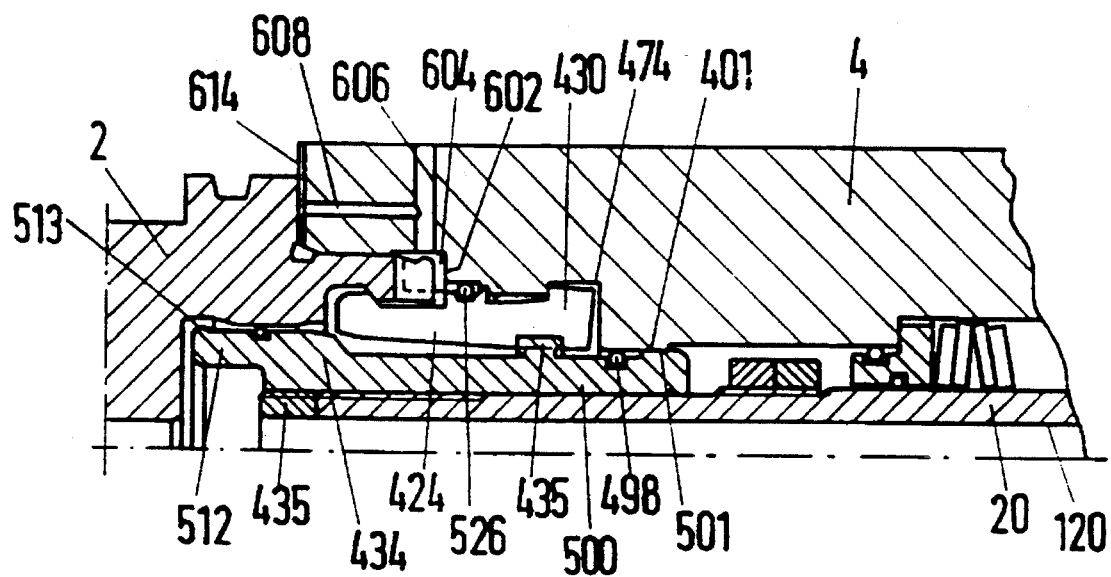
Figure 22B:
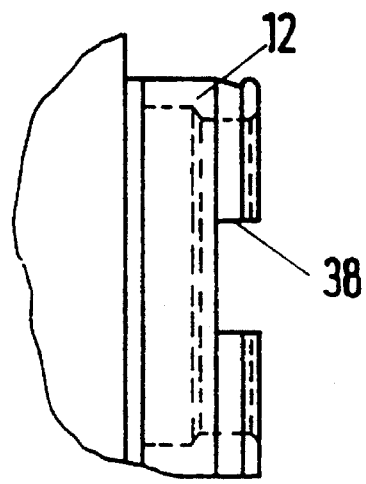
Figure 23:
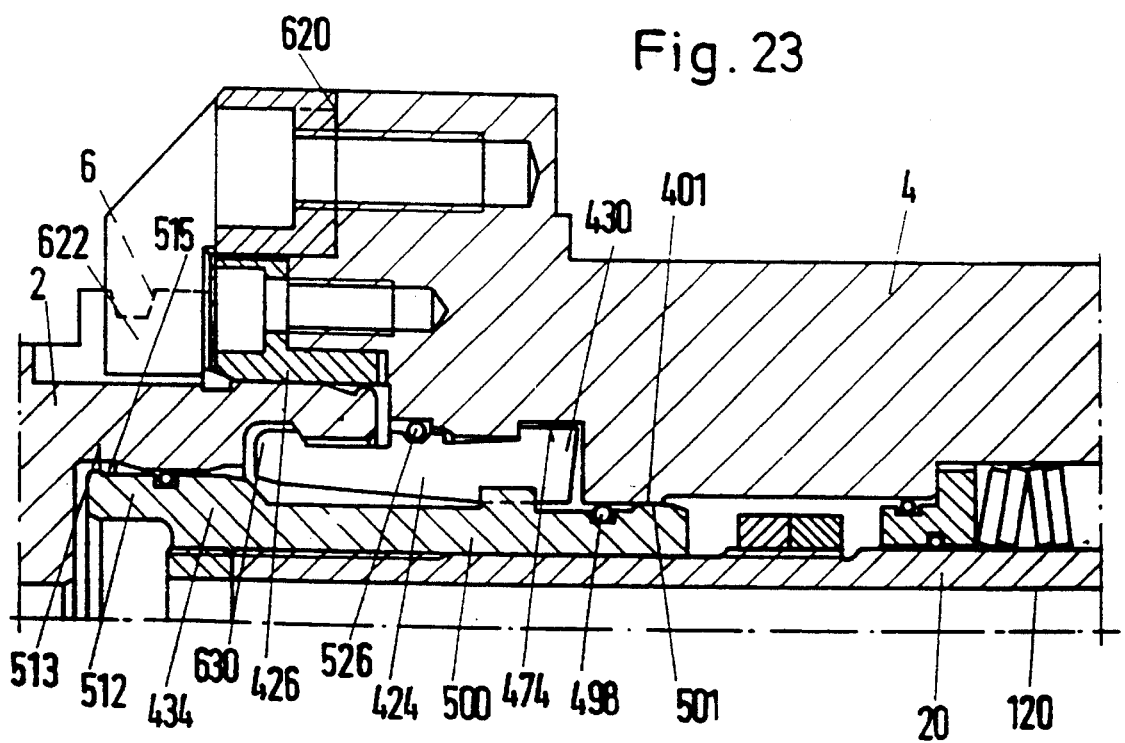
Figure 25B:
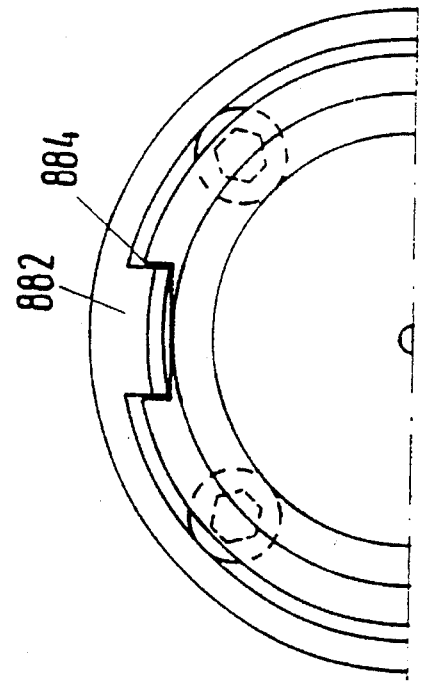
Figure 25A:
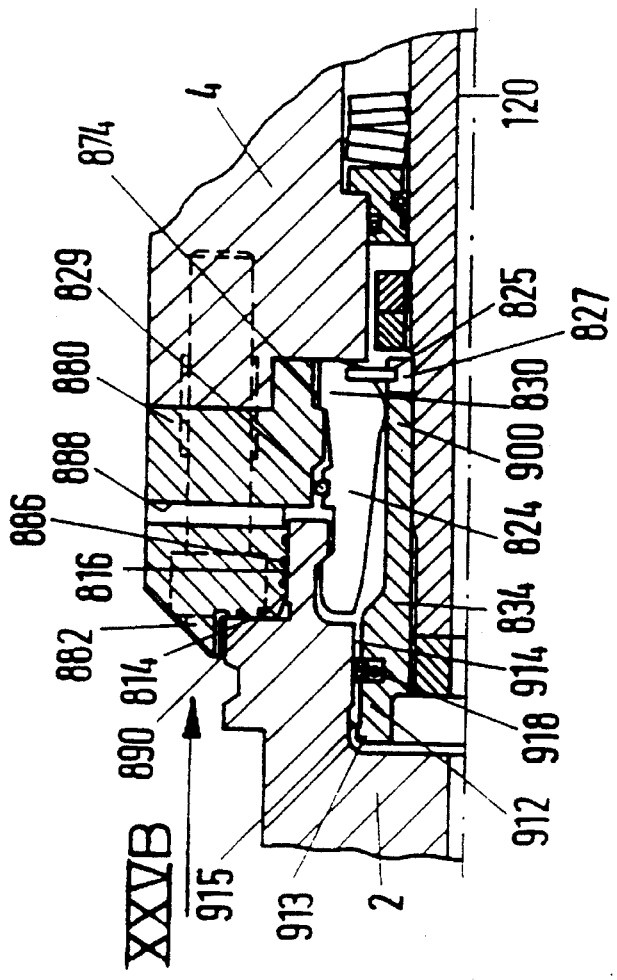
Figures 27A, 27B:
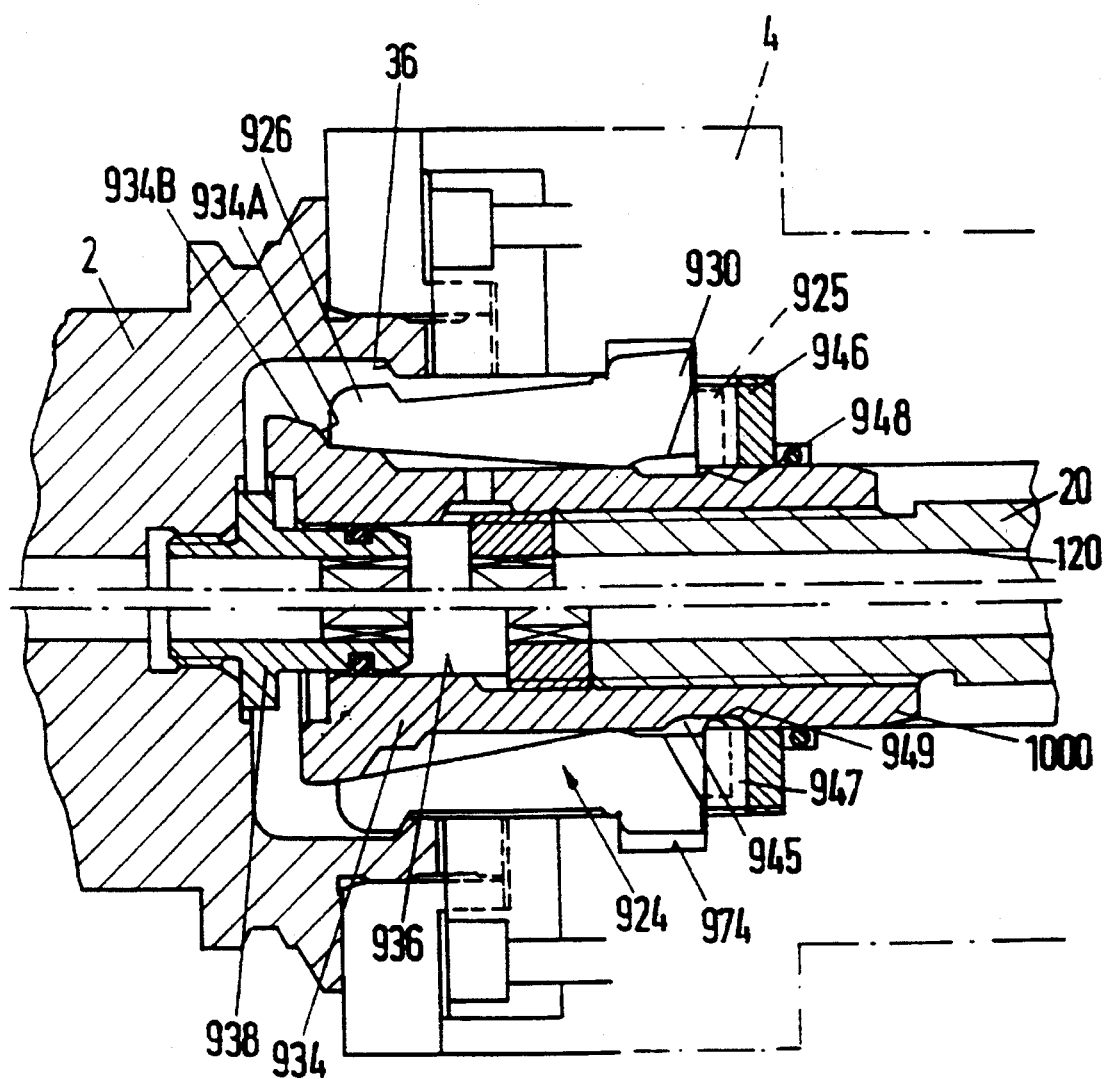

Various embodiments of the present invention will be described in detail on the basis of the schematic drawings appended hereto. These drawings are as follows:

FIG. 1: an axial cross section through a first embodiment of the coupling system;

FIG. 2A: an end view of the tool system module configured as a tool receptacle;

FIG. 2B: a partial cross sectional side view of the tool receptacle;

FIG. 3A: a cross sectional drawing of the end section of machine tool spindle that is proximate to the tool receptacle;

FIG. 3B: an end view of the machine tool spindle as in "IIIB" in FIG. 3A;

FIG. 4A: a partial axial section of a driver ring;

FIG. 4B: a view of a driver ring as at "IVB" in FIG. 4A;

FIG. 4C: a view of a driver ring as in FIG. 4A as at "IVC";

FIG. 5A: in the upper part, a longitudinal section through a clamping claw, and in the lower part a side view of a sleeve body from which the clamping claw can be produced;

FIG. 5B: in the upper part, an end view of three clamping claws spaced at equidistant peripheral distances from each other, and in the lower part an end view of the sleeve-like body shown in FIG. 5A;

FIG. 6A: a longitudinal section of a guide cylinder;

FIG. 6B: a view of the guide cylinder as at "VIB" in FIG. 6A;

FIG. 7: a longitudinal section through the thrust cone as in FIG. 1;

FIG. 8: a side view of the hollow journal as in FIG. 1;

FIG. 9: an assembly of the individual elements shown in FIGS. 2 to FIG. 8, to clarify the assembly process;

FIG. 10: a partial cross sectional side view of the coupling system at the beginning of the coupling process;

FIG. 11: as in FIG. 10, a view of the coupling system, wherein the centering cylinder is just entering the machine tool receptacle;

FIG. 12: as in FIG. 11, a side view of the coupling system with a completely inserted centering cylinder;

FIG. 13: a view, corresponding to FIG. 1, of a modified embodiment of the coupling system;

FIG. 14: an axial cross section of a further embodiment of the coupling system, this being in the released state;

FIG. 15: an end view of the end section of a machine tool spindle that is proximate to the tool receptacle, as at II in FIG. 14;

FIG. 16: an end view of the tool system module in the configuration of a tool receptacle as at XVI in FIG. 14;

FIG. 17: a cross section as at XVII—XVII in FIG. 14;

FIG. 18A: a partial axial cross sectional view of a drive ring;

FIG. 18B: a view of a drive ring as at "XVIIIB" in FIG. 18A;

FIG. 18C: a view of a drive ring as at "XVIIIC" in FIG. 18A;

FIG. 19A: an axial half section of a further embodiment of a coupling system in cross section as at "XIXA—XIXA" in FIG. 19B;

FIG. 19B: a radial cross section as at "XIXB—XIXB" in FIG. 19A;

FIG. 19C: the half section XIXC in FIG. 19B;

FIG. 19D: the half section XIXD as in FIG. 19B;

FIG. 20A: as in FIG. 19A, a half cross sectional view of a further embodiment of a coupling system as at XXA in FIG. 20B;

FIG. 20B: an end view as at XXB of the machine tool side coupling element of the embodiment as in FIG. 20A;

FIG. 20C: a half section as at XXC in FIG. 20B;

FIG. 21A: a half section of a further embodiment of a machine tool side coupling element of the coupling system in a section as at XXIA in FIG. 21B;

FIG. 21B: an end view of a coupling element as in FIG. 21A;

FIG. 21C: a half section as at XXIC in FIG. 21B;

FIG. 22A: a radial half section of a further embodiment of the coupling system;

FIG. 22B: partial section of the end section of the tool system module shown in FIG. 22A;

FIG. 23: an axial half section of a further embodiment of the coupling system;

FIGS. 24A and 24B: axial half sections of two further embodiments of the coupling system;

FIG. 25A: an axial half section of a further modified embodiment of the coupling system with a front flange;

FIG. 25B: a partial section as at XXVB in FIG. 25A;

FIGS. 26A and 26B: as in FIG. 25, views of a further embodiment of the coupling system;

FIGS. 27A and 27B: axial cross sections from a last embodiment of the coupling system, wherein FIG. 27A shows the release and FIG. 27B shows the locked position of the coupling system.

FIG. 1 shows a tool-system module 2 such as, for example, a basic receptacle of a machine tool and a machine tool spindle 4 such as, for example, the spindle of a grinder. The coupling system, which is to be described in greater detail below is related to the point of intersection between these two components, of which one represents a machine tool system module and the other a machine tool part which bears this.

In order to permit the automatic changeover of the machine tool system module, this has a positioning groove 6, that can be configured in the conventional manner. The coupling system which is to be described in greater detail below must be in a position to press the components firmly against each other in a predetermined radial and axial position. A further essential criterion is the easy release of the coupling for the smallest possible removal path. To this end, the coupling system is constructed as follows:

The basic tool receptacle 2, which is shown in detail in FIGS. 2A and 2B, has a radial annular surface 8 and a centering surface 10, both of which are formed on the outside of a centering cylinder 12. Corresponding counter-surfaces 14 and 16 for the surfaces 8 and 10 are to be found on the side of the spindle, and these are shown in detail in FIG. 3. The surface 14 is configured as a radial annular surface, and the surface 16 is a component of a centering recess for the centering cylinder 12. This results in a plain surface pairing, that can be configured so as to be uninterrupted or unbroken.

The release and insertion of the coupling takes place, as in a number of conventional coupling systems, by means of an operating rod 20 that is accommodated centrally in the spindle 4, and this rod can be pushed to the left against the force of a spring package, which is not shown in greater detail in FIG. 1. A wedge drive 22 is activated by the operating rod 20, and this controls the clamping elements 24. Six clamping claws, arranged at an equal angular interval of 60° to each other, are provided as clamping elements 24 and these claws bridge the point of contact between the elements 2 and 4 that are to be coupled to each other in the manner of a clamp. The span claws have a claw sector 26 that lies radially within the centering cylinder 24, a rod section 28 that is adjacent to this, and a hook-shaped end section 30, that engages in a groove that is fixed axially with reference to the spindle. The engagement of a thrust cone 34 means that the clamping elements 24 can be pivoted so that their claw sections 26 enter a groove-like recess 34 in the centering cylinder 12, while their hook-shaped end sections 30 are supported in the groove 32; this generates an axially directed application force between the basic tool receptacle 2 and the shaft 4.

In order to transfer the torque between the spindle 4 and the tool system module 2 there is provision made for the claws to mesh, and this will be described in greater detail below. As can be seen from FIG. 2A and 2B, there is a diametrically oriented driver groove 38 in the centering cylinder 12, this being ground in, for example, so that two matching plain surfaces 40 result. Suitably formed driver claws 42 engage in this groove-like recess, which in the embodiment shown is formed on a driver ring 44.

The driver ring is shown in detail in FIG. 4. This driver ring has cylindrical matching surface 46 to provide for matched engagement with the cylinder surface 16 of the spindle 4, a radial surface 48 that lies flat on a shoulder surface 50 of the centering recess 18 of the spindle 4, and a driver extension 52 that engages in an axial recess 54 on the shoulder 50 in the centering recess 18. The driver extension 52 is essentially of polygonal profile, in which connection it has been shown to be advantageous that the driver extension be based on a prism configuration with three edges. The driver extension, like the recess 54, has three convex lateral areas 56 that are curved outwards, and these merge into each other through grounded sections 58. In this way, the driver extension 52 is of a shape that is similar to a K-profile, that is used in machine construction as a positive shaft-hub connection.

In order to ensure that the driver ring 44 is fixed axially, this has a radial inner shoulder 60, against which the retainer sections 62 of a clamping element 64 (see FIG. 6) can be pressed. To this end, the clamping body has a threaded section 66, with which it can be screwed into the spindle 4. The retaining section 62 is essentially formed as a sleeve, so as to leave sufficient room in its interior for the operating rod 20. In the end area that is remote from the threaded section 62, the clamping body 66 has a hexagon socket 68, which makes it simpler to screw it into the spindle 4.

It can be seen from FIGS. 1 and 6 that the clamp claws 24 are guided within the clamping body 64. To this end, between the retaining section 62 there are a number of guide recesses 70 that corresponds to the number of clamp claws, in which the span claws 24 can be guided so as to be able to move radially with some clearance. To this end, the bottom of the groove of the guiding recess 70 falls off towards the tool system module 2, so that the span claws can pivot to a limited extent in a radial direction, within the guide recesses 70. The base 72 of the groove is shown in FIG. 6A by means of a dashed line.

In order to fix the clamp claws 24 in an axial direction on the spindle 4, there is a supporting groove 74 in the driver ring 44, and the front groove wall 74 of this—as can be seen in FIG. 1—lies flat with the hook-shaped end section 30 of the particular clamp claw 24 when the parts 2 and 4 are coupled. In order to permit the above-described limited pivoting movement of the span claws 24, the supporting groove 74 is made wider than the hook-shaped end sections 30.

FIG. 5 shows details of the configuration of the clamp claws 24. A sleeve-like rotationally symmetrical body 78 serves as a blank in the production of span claws of this kind, and the corresponding span claws 24 can be cut from this, as can be seen in the upper part of FIG. 5B. The hook-shaped end section 30 has two conical surfaces 80 and 82, in order to permit the pivoting movement in the guide recess 70 of the clamp body 64. On the outside, the claw section 26 is also formed from two conical surfaces 84 and 86, of which the conical surface 86 can be made to lie flat with a slope (88) (see FIG. 2B) of the groove-like recess 36 in the centering cylinder 12. The other conical surface 84 of the claw section 26 slopes down to the tool system module 2, which means that in particular, in conjunction with a chamfer 90 on the face of the centering cylinder 12 the clamp claws 24 will be forced to pivot inwards when the centering cylinder is inserted into the centering recess 18.

It can be seen from FIG. 1 that the dimensions of the clamp claws 24 are matched to the shape of the groove-like recess 36 and the supporting groove 74, which provides for the greatest possible area of contact between the functional surfaces. It can also be seen from FIG. 1 that the hook-shaped end section 30 of each clamping element 24 is permanently fixed in a radial direction in conjunction with the guide recess 70, which effectively prevents any tilting of the clamping claws 24.

The magnitude of the axial force that is to be generated can be effected by the slope of the conical surface 86. A further possibility for influence is provided by the configuration of the thrust cone 34 in conjunction with the associated supporting surface 92 on the side of the clamping claws 24. This permits a two-stage translation of the tensile force of the operating rod 20 that is initiated in an axial direction. In the embodiment shown the supporting surface 92 is convex, so that there is a linear contact between the thrust cone 34 and the supporting surface 92. This configuration permits self-centering of the drive cone 34 and thereby the initiation of the axial compressor force in the two components set out to be coupled, this compressor force then being free of any transverse forces. In order to impart the required degree of radial freedom to the drive cone 34, the operating rod 20 is not fixed radially in the area of the point of intersection. It extends with some radial play through an inside recess 94 (see FIG. 6A) of the clamping elements 64. The inside recess 94 has a side cut or turned groove 96 to accommodate an elastic ring, for example, an O ring 98, which preferably rests linearly on a cylindrical coupling collar 100 of the thrust cone 34. The outside diameter of the coupling collar 100 is thus similarly smaller than the inside diameter of the inside recess 94 within the clamping element 64, so that there is still some damped radial movement of the thrust cone 34 relative to the spindle 4. Thus the connection with the operating rod 20 is effected through the coupling collar 100, for which purpose an inside thread 102 is provided. On the side that is remote from the inside thread 102 the thrust cone 34 has a plain or flat surface 104 in which there is a plurality of recesses 106 for the engagement of a suitable tool.

Coaxially to the inside thread 102 there is a further inside thread 108 to accommodate a threaded section 110 of a hollow journal 112 and this fits into a drilling 114 of the basic tool receptacle 2. On the outer side of the hollow journal 112 there are two annular grooves 116 to accommodate sealing rings 118, so as to prevent the ingress of lubricating or cooling agents into the space 124 radially within the centering cylinder 12 when lubricant is supplied through a longitudinal recess 120 and an inside recess 122 in the hollow journal 112.

The above description shows that under control of the operating rod 20 the claw sections 26 are pushed positively into the groove-like recess 36, which means that a multiplied axial application force can be generated in the area of the radial annular surfaces 8 and 14. If the operating rod 20 is moved to the left as in FIG. 1, the clamp claws 24 are free of force which means that the clamp claws 24 can be pivoted so far inwards that the point of each claw section that is radially outermost lies within the inside diameter $D_{12}$ of the centering cylinder 12 (see FIG. 2A). The conical surfaces 84 and 86 on the claw section 26 ensure that when the centering cylinder 12 is withdrawn the clamp claws pivot inwards. In order to further enhance this movement of the clamp claws, there is in FIG. 1 an elastic ring 126 that is accommodated in the grooves 128 (see FIG. 5A), and which prespresses these clamp claws 24 radially inwards.

The preceding description shows that the coupling system is not only capable of applying large axial clamping forces evenly around the periphery, but that, in addition, because of the spatial separation of the components used to transfer the axial forces and of the peripheral forces there can be an optimization of the functional surfaces required for this. This also results in the added advantage that the coupling system can also be used to index a tool system module by predetermined angular steps relative to the machine tool. To this end, reference is once again made to FIG. 4, from which it can be seen that the plane of symmetry $E_s$ of the driver claws $42_{10}$ an angle of 30° with an axial plane $E_A$ through a vertex 130 of the driver extension 52. This means that the tool receptacle can be positioned in partial steps of 30° each referenced to the spindle 4. The manner in which the above-described coupling system is assembled will be described in greater detail below with reference to FIG. 9.

First, the hook-shaped end sections 30 of the clamp claws 24 are threaded into the supporting groove 74 of the driver ring 44 and are roughly positioned so as to be equally spaced at the same angular distance from each other. This is done preferably in a vertical position. Then, the threaded section 66 of the clamp element 64 is slid radially within the clamp claws 24 through the driver ring 44 so far that the star-shaped retainer section 62 abuts against the inner shoulder 60 of the driver ring 44. In this state, the clamp claws 24 are already held positively within the driver ring 44. Then, the whole assembly consisting of the driver ring 44, the clamp claws 24, and the clamp element 64 is slid into the centering or recessing index 18 and is secured by screwing in the threaded section 66 into a corresponding internal thread 132 of the spindle 4 such that the driver extension 52 engages positively into the recess 54 and there is a 2-dimensional contact between the shoulder surface 50 of the spindle 4 and the radial surface 48 of the driver ring 44. After installation of the elastic ring 98 into the groove 96 the operating rod (not shown in FIG. 9) is screwed together with the coupling collar 100 of the thrust cone 34, whereupon the hollow journal 112 shown in FIG. 8 is connected with the thrust cone 34. If the operating rod is moved to the left against the above-discussed spring packet in the drawing shown in FIG. 1 and FIG. 9, the thrust cone 34 is released from engagement with the supporting surface 92 of the clamp claws 24, whereupon the tool receptacle 2 can be installed on the spindle 4. FIG. 10 shows the coupling system at the beginning of the coupling process. For reasons of simplification, the operating rod has been omitted. The drawings do not show the sealing rings 118 on the hollow journal 112. The thrust cone 34 is in its end position in this position, so that the clamp claws 24 can be pivoted so far inwards that the centering cylinder of the tool receptacle 2 can be slid over the claw end sections 26, as is shown in FIG. 11. At the same time, when the centering cylinder 12 is slid into the centering or indexing recess 18, the hollow journal 112 enters the drilling 114 of the tool receptacle 2 so that the space 124 is sealed against the drilling 114 by the sealing rings (not shown herein). Because of the centering patch of the surface 10 the radial ring surfaces 8 and 14 are slid towards each other so as to be oriented with their faces parallel. Finally, the driver claws 42 engage in the driver groove 38, whereupon the annular surfaces 8 and 14 are brought into contact with each other.

This condition is shown in the drawing as in FIG. 12. When the operating rod (not shown herein) is released, the spring packet (not shown herein) becomes effective and attempts to move the operating rod together with the thrust cone 34 to the right, as in FIG. 12. When this happens, the thrust cone rides onto the supporting surface 92 and presses the claw sections 26 radially and evenly outwards. During the ensuing pivoting movement of the clamp claws 24 in the guide recesses 70 of the clamping elements 64 the position of the hook-shaped end sections 30 is permanently fixed in the supporting groove 74 of the driver ring 44. It is preferred that the geometrical conditions be so coordinated that in the tightened state there is a 2-dimensional contact both of the hook-shaped end section 30 as well as of the claw sections 26 on the appropriate countersurface 76 or 36, respectively. Finally, the components of the coupling system take up the position shown in FIG. 1 when in the coupled state, which results in a self-centering effect of the thrust cone because of the radially elastic support of the coupling collar 100 within the clamping element 64.

FIG. 13 shows a further embodiment of the coupling system which, however, differs only slightly from the embodiment described heretofore. For this reason, this figure shows only those reference numbers as are required to explain this variation. Those components of the coupling system that are immediately comparable with the components described heretofore bear the same reference numbers to which an apostrophe (').

The first variation of the embodiment shown in FIG. 13 is seen in the fact that on the side of the spindle 4' there is a centering ring 140 that is preferably secured to the face of the spindle 4 so as to be adjustable in a radial direction. This is shown by means of the dashed line 142. This configuration makes it possible to adjust the rotation of the tool system module 2'. The centering ring 140 is preferably of hardened steel or hard metal in order to keep wear as low as possible.

A further modification compared to the embodiment shown in FIGS. 1 to 12 is seen in the area of the hollow journal 112'. Unlike the embodiment described heretofore, this hollow journal 112 is connected rigidly with the tool system module in the configuration as a tool receptacle 2'. The projecting end fits into an inside drilling 114 of the thrust cone 34' when once again sealing rings 118' can be used. It is plain that with this configuration the path of the movement used to release the parts 2' and 4' can be limited to the length of the centering cylinder 12'. With the variation from the embodiment that is shown it is also possible to work with clamp claws 24 that are bent radially inwards, in order that, in this way, it is possible to be able to engage in a groove-like recess of a centering cylinder 12 while retaining the support of the hook-shaped end sections 30, said centering cylinder having a reduced diameter. In this case, it is expedient to work with an intermediate ring that is inserted into the centering recess 18 of the shaft 4 and has an inside diameter that corresponds to the outside diameter of the reduced centering cylinder. By using this variation it is possible to couple tool system modules of very different diameters to the machine in the least possible installed space, on one and the same intersection point.

In a further variation of the embodiment shown it is, of course, also possible to use the coupling system to couple other machine tool or tool parts. The system can also be used for fixed tools, such as, for example, cutting or turning tools.

In the embodiment described, there are six clamp claws 24. It is, of course, also possible to vary the number of clamp claws although there should not be fewer than three in order to distribute the axial forces as evenly as possible about the periphery.

From this explanation it is clear that the coupling system described is also suitable for retrofitting to conventional machine tools. To this end, all that is required is that a spindle attachment flange be provided that is then fitted with the centering recess 18. A further embodiment of the coupling system is described below, this having, in addition, a flushing-channel system. For the sake of simplicity those components that are comparable with elements of the embodiment described heretofore will bear identical reference numbers. FIG. 4 shows a tool system module 2 such as, for example, a tool receptacle and a machine tool spindle 4 such as, for example, the spindle of a grinding machine.

The release and engagement of the coupling takes place in the same manner as set out for the embodiments described heretofore.

In order to transfer the torque between the spindle 4 and the tool system module 2 there is a claw toothing that will be described below. As shown in FIG. 16, in a diametrical driver groove 38 is machined into the centering cylinder 12, i.e., by grinding, so that two matching plane surfaces 40 result. Correspondingly shaped claws 42 engage in this groove-like recess; in the embodiment shown these are configured on a driver ring 44.

Reference can be made to the description of FIG. 4 for the configuration of the driver ring. FIG. 18 shows the common constructional elements.

It can be seen from FIG. 4 that the clamp claws 24 are guided within the clamping elements 64. To this end, between the retaining section 62 there is a plurality of guide recesses, the number of which corresponds to the number of clamp claws, in which the clamp claws 24 are guided so as to be radially moveable with some degree of free play. In addition, a groove base 70 of the guide recesses slopes down towards the tool system module 2, so that the clamp claws are capable of limited pivoting movement in a radial direction, within the guide recesses. The base of the groove is shown by the dashed line in FIG. 14.

Details of the configuration of the clamp claws 24 are set out in the description of FIGS. 5A and B.

A hollow journal 112 is connected rigidly to the tool system module 2. The protruding end fits in an inside drilling 114 of the thrust cone 34, there being sealing rings 118 at the sides of the hollow journal 112. It is plain that with this configuration the path of movement to release the parts 2 and 4 can be limited to the length of the centering cylinder 12.

It can be seen from the preceding description that in conformity with the embodiment described above, under the control of the operating rod 20 there is a positive outward pressure on the claw sections 26 into the groove-like recess 36 which means that a repeatedly transmitted axial contact force can be generated in the area of the radial annular surfaces 8 and 14.

Assembly of the additional embodiment takes place according to the above-described coupling system.

Unlike the above-described embodiment, there is a centering ring 140 on the side of the spindle 4 and this is preferably secured to the face of the spindle 4 so as to be adjustable in a radial direction. By means of this configuration it is possible to adjust the rotation of the tool system module 2. The centering ring 140 consists, preferably, of hardened steel or hard metal, in order to keep wear as low as possible.

In order to achieve a cleaning effect of the functional surfaces that can be brought into engagement with one another a compressed air flushing channel system is provided, and this will be described in greater detail below. In this system, compressed air is supplied from a source (not shown herein) to an annular channel 300 between the operating rod 20 and the spindle 4. The annular channel 300 opens out into a compressed air supply space 302 as is indicated by the arrows in FIG. 14. A compressed air flushing flow that splits into two branches is generated from the common compressed air supply space 302. One such branch flow passes through an intermediate space 304 between the operating rod 20 and the guide element 64 into a plurality of longitudinal recesses 306 that are preferably distributed equally about the periphery on the outer side of the coupling collar 100 of the thrust cone 34. From there, the flow passes to the front side of the guide element 64 and escapes to the outside between the guide element 64 and the rear of the thrust cone 34, in a radial direction, which means that the claw sections 26 can be cleaned with compressed air.

Leaving the compressed air supply space 302 the other branch flow of compressed air passes into preferably a plurality of axial notches 308 in the area of the thread in the guide element 64. An annular chamber 310 is supplied through the axial notches 308 and this annular space is sealed off from the clamp claws 24 by means of a sealing ring 312 installed between the guide element 64 and the driver ring 44. Discrete side cuts 314, preferably distributed equidistantly about the periphery, extend from the annular chamber 310 and each of these opens up into a longitudinal groove 316 on the outside of the driver ring 44. At the front end of the longitudinal groove 316 the flow of compressed air branches once again. The compressed air passes through an annular space 318 and through a plurality of compressed air flushing channels 320, preferably distributed equidistantly about the periphery, to the annular ring surface segments 14A (FIG. 15), by means of which the tool system module 2 is supported on the spindle 4. The compressed air flushing channels 320 are so formed that the openings 322 are essentially central in the radial ring surface segments 14A. It can be seen from FIG. 4 that these radial ring surface segments 14A are configured in that grooves 34 that extend diametrically are made in the face of the spindle. This forms dirt chambers that hinder any soiling of the functional surfaces 14A. A further flow of compressed air for cleaning purposes passes from the annular space 318 into the inner surface 16 of the cylinder, as is indicated by the arrows in FIG. 14. This part flow is generated in that the inside diameter of the centering ring 140 is matched to the outside diameter of the driver ring 44 so as to leave an annular gap 326.

It is clear from the description that when the parts 2 and 4 that are to be coupled are joined together the compressed air that emerges from the compressed air flushing channels 320 is accelerated to an increasing extent as the parts 2 and 4 become closer together which means that the cleaning effect of the plane surface segments 14A and the annular surface 8 is increased.

When the parts 2 and 3 are completely together the openings 322 of the plane surface 8 are closed so as to prevent any further escape of compressed air, which thus saves energy. The supply of compressed air is shut off after the conclusion of the coupling process. By deviating from the embodiment shown it is also possible to work with clamp claws 25 so that, in this way, whilst retaining the support of the hook-shaped end sections 30 it is possible for the centering cylinder 12 to engage in a groove-like recess, said centering cylinder 12 being of a reduced diameter. In this case, it is expedient to work with one intermediate ring that is inserted in the centering recess 18 of the spindle 4 and which is of an inside diameter that corresponds to the outside diameter of the reduced centering cylinder. By using this variation it is possible to couple tool system modules of very different diameters at one and the same point of intersection in the smallest possible installed space.

Reference is made below to FIGS. 19A to 19D, in which a further embodiment of the coupling system is shown. For reasons of simplification, once again the components of the coupling system that correspond essentially to the components of the embodiments described above bear the same reference numbers. The essential difference between the embodiment as shown in FIG. 19 and the embodiments described above is the fact that no driver ring 44 is provided; that the drive in the direction of the periphery by specially shaped driver blocks, and in that a precentering system is provided.

In the spindle 4 there is an undercut supporting groove 474 for a hook-shaped end section 430 of the clamping element 424, of which— as a variation of the above-described embodiments—there are eight. Stabilization of the clamping element 424 in the axial direction is effected by means of radial cross pieces 435 in a coupling element 500 of a thrust cone section 434 that is screwed tightly to the operating rod 20 and secured by means of a hollow counter screw 433. The thrust cone body 434 forms two conical surfaces 434A and 434B that are at an angle to each other and are located on the outside between the coupling element 500 and a hollow cylindrical extension 512, that works in conjunction with a tolerance drilling 514 in the tool system module 2; conical surface 434B subtends a smaller angle than the surface 434A. Because of this configuration, it is possible to reduce the path of the operating rod 20 because of a relatively rapid outward movement of the claw sections 426 takes place before the actual application force is generated through the surface 434B.

In the area of its two end sections, the thrust cone section 434 has two matching surfaces 513 or 501, respectively, of which the first works in conjunction with the tolerance drilling 514 and the latter with a section 401 of the drilling in the spindle, which, on the side that is remote from the work system module 2, widens out into a recess 403. The tolerance drilling 514 widens out correspondingly in a section 515 of the recess. The hollow cylindrical extension 512 engages through a seal with the tolerance drilling 514. A further seal 498 is provided between the section 401 of the drilling and the coupling element 500.

FIG. 19 shows the components of the coupling system when the coupling is released, in that the operating rod 20 is displaced to the left. The thrust cone section 434 and thus the hollow cylindrical extension 512 of the spindle 4 is centered by the pairing of the surfaces 401 and 501, so that the matching surface 514 which is preferably rounded or spherical, can form a centering aid for coupling the tool system module 2. If the operating rod 20 is released and thus, as shown in FIG. 19A, is thrust to the right, the cylindrical matching surface 501 moves out of engagement with the section 401 of the drilling, so that there is no more force exerted on the thrust cone section 434, because the matching surface 513 comes to rest in the recess section 515. The operating rod 20 together with the thrust cone section 434 is thus free to float radially in the tool spindle 4 when the clamping force is applied. The positive centering of the thrust cone section 434 is preferably terminated at the start of the generation of pressure.

In the embodiment shown in FIG. 19 an additional centering aid is provided by a special configuration of the face area of the centering cylinder 12 of the tool system module 2. The centering surface head makes a transition through a notch in a rounded end section 412, which is preferably spherical; the diameter of the sphere that encloses the section 412 is slightly smaller, for example, by a few hundredths of a millimeter, than the inside diameter of the opposite surface on the machine tool side of the coupling element 4.

The drive between the parts 4 and 2 in the peripheral direction is effected through a pair of diametrically opposed driver bodies or driver stones 550 that are accommodated in the radial groove 552 of the spindle 4, into which they are screwed. In the driver bodies 550 there are slots 554 that are oriented radially outwards, through which the shaft of the particular retaining screw extends. The areas of the driver bodies 550 that are located radially inwards engage in driver grooves (not shown in greater detail) in the centering cylinder 12. The driver bodies 550 also extend through an axial extension 562 of a centering ring 560 that serves as a wear or sacrifice ring and to this end can be made of wear-resistant material such as hard metal. The centering ring 560 is screwed securely to the spindle and forms the above-described, raised radial annular surface segment 14A, against which the radial annular surface 8 of the tool system module 2 is pressed. The centering ring 560 has threaded holes 564 that align with the retaining screws 556, and these drillings 564 can be closed by means of grub screws 566. This construction makes it possible to replace the driver stones 550 when the tool system module 2 has been taken off and the grub screws 566 have been removed, without having to remove the centering ring 560 when this is done.

An elastic ring, for example, in the form of a spiral (?) spring is numbered 526; the claw sections 46 can be sprung radially inwards with this.

It can be seen from FIG. 19 that a flushing channel system to clean the functional surfaces that are to be brought into engagement is formed on the component parts of the coupling system that are to be joined together. To this end, a radial channel 570 is formed between the driver stone 550 and the centering cylinder 12, on the one side, and on the other side there is a break in the centering ring 560. This radial channel opens out into an annular space 572 (FIGS. 19C and 19D), from which a plurality of side cuts 572 extend to the radial annular surface segments 14A. In addition, there are seepage oil drillings to pocket between the radial annular surface segments 14A.

FIG. 20 shows another embodiment of the coupling system, which differs from the embodiment described hereto on the basis of FIG. 19 only in that the drive between the spindle 4 and the tool system module 2 is effected in an area that is located further out in a radial direction, with no additional centering ring being provided. With regard to the parts that coincide with the embodiment shown in FIG. 19, reference is made to the above description. Identical functional elements are provided with the same reference numbers, as is the case below.

Groove stones 580 are provided on the sides of the spindle 4 to effect the drive between the parts 2 and 4; these are accommodated in radial grooves 582 of a face surface 584 and are there screwed in place. These groove stones can be so configured as is the case in the quick release couplings as set out in DIN 2080 or DIN 69871. The matching face 584 also has a raised radial annular surface segment 14A, against which the radial flange of the tool system module 2 lies. Side cuts 586 lead from the radial annular surface segments 14A to an annular space 588 that can be supplied with a pressurized flushing medium. In addition, other channels 589 extend from this annular space 588 within the groove stones 580, and these provide an outlet for seepage oil and a place from which accumulations of air can be vented.

The version shown in FIG. 1 differs from that shown in FIG. 20 only in that between the groove stone 580 and the spindle 4 there is an additional centering ring 590. There are radial grooves 592 to accommodate the groove stones 580 in the face of the centering ring. Compressed air flushing channels are numbered 596; these extend essentially axially through the centering ring 590 and emerge in the area of the radial annular surface segments 14A of the centering ring 590. The channels are numbered 599 and these correspond to the channels 589 in the embodiment shown in FIG. 20.

In the embodiment shown in FIG. 22 the drive between the spindle 4 and the tool system module 2 is effected through recesses 38 in the area of the face of the centering cylinder 12. Drive bodies 64 are secured to a shoulder 602 on the spindle 4 for the drive, and these engage with some clearance in the drive grooves 38 of the centering cylinder 12. A plurality of radial drillings 606 extend from the shoulder 602, and side cuts 608 lead from these radial drillings 606 to the radial annular surface segments of the face 614 (not shown in greater detail) of the spindle 4, in order to configure the pressurized agent flushing system to clean the functional surfaces of the coupling system.

In the embodiment shown in FIG. 23 the drive in the direction of rotation between the spindle 4 and the tool system module 2 is effected through a driver ring 620 that has at least two driver lugs 622 that face radially inwards and which engage in suitably formed grooves on the connecting flange of the tool system module 2. Centering is effected with the assistance of a centering ring 630, that is overlapped by the driver lugs 622. In place of a ring it is also possible to provide two hook-shaped driver stones.

The embodiment shown in FIGS. 24A to 24B corresponds essentially to the embodiment shown in FIG. 19 with regard to the drive in the peripheral direction between the elements that are to be coupled. In this regard, comparable parts bear identical reference numbers as are used in FIG. 19. In this embodiment, too, the driver stones 550 can be replaced by means of retaining screws 556 in a groove 552 of the connecting flange of the spindle 4. An extended pre-centering of the centering cylinder 12 takes place through the centering ring 560, which once again can be produced from wear-resistant material.

In the embodiment shown in FIG. 24A, the centering cylinder 12 is configured on the basic receptacle part 640 for a modular tool 650, whereas in the embodiment shown in FIG. 24B the centering cylinder 12 is a component of a massive tool 660. The modular tool 650 can be clamped against the basic receptacle 640 with the assistance of a pendulum-type journal 652, in that a retaining screw 654 is forced into contact with a wedge surface 656 of the pendulum-type journal 652, which rests through a spherical surface 658 against the cone 659.

Unlike the embodiments described above, in the embodiment shown in FIG. 24 there is no double pre-centering. Also different is the configuration of the thrust body or thrust cone part and of the clamping elements, and this will be dealt with in greater detail below.

The part of the thrust cone numbered 734 has a cylindrical recess 736 radially within the functional surface 734A and 734B, in which a hollow plunger 738 is sealed; the spherical sealing surface 742 of this plunger is pressed by means of springs 740 against a cone 744 either in the pendulum-type journal 652 or in a massive tool 660. This configuration permits a central lubricant supply for the tool system module through the interior of the operating rod 20. In place of the elastic rings 26, 126, or 526 provided in the embodiments described above, in the embodiments shown according to FIGS. 24A and 24B positive movement control of the clamping elements numbered 724 is effected, in order to ensure that the claw sections 726 move out of engagement with the groove-like recess 36 in the centering cylinder 12 when the operating rod 20 is moved to the left, i.e., when the coupling system is released. To this end, on the side of a coupling shoulder 800 of the thrust cone part 734 there is a stabilizing body 746 that can be pressed against the rear incline control surface 750 of the clamping elements 74 by means of a spring 748. The hook-shaped end sections 730 of the clamping elements 724 rest in a supporting groove 774 of the shaft 4 and with a rounded section 731 on the coupling shoulder 800. Within this stabilizing body there is a number of clamping elements 724 that corresponds to the number of slots 747 in which guiding ribs 725 at the ends of the clamping elements 724 engage with some clearance. It can be seen from FIG. 24A and 24B that movement of the operating rod 20 and thus of the part 734 of the thrust cone to the left (FIG. 24A) under the action of the spring loaded stabilizing body 746 results in a downward pivoting motion of the claw section 726.

A further embodiment is shown in FIG. 25. In this embodiment a supporting groove 874 for the hook-shaped end section 830 of the clamping elements 824 is configured between the spindle 4 and a front flange 880, that engages with driver lugs 882 in corresponding recesses 884 of the tool system module 2. The part of the thrust cone is configured on the left-hand end as in the embodiment shown in FIGS. 19 to 23, so that a pre-centering of the work system module that is to be coupled can take place.

In order to configure a flushing channel system that can also serve as an air-bleed system there is a helical groove 886 formed in the front flange 880, in the area of the cylindrical matching surface, and this can be supplied through an air channel drilling 888. The helical groove 886 is connected with a spiral groove 890 in the plane surface 814 of the front flange 880, so that a cleaning channel can be formed through the air channel drilling 888 and the grooves 886 and 890.

Unlike the embodiments described heretofore, in the embodiment shown in FIG. 25, stabilizing of the clamping elements 824 is effected through an indexing pin 825 that is installed at the end, which engages with clearance in an axial slot 827 on the coupling piece 900 of the part 834 of the thrust cone. An elastic ring through which the radial tensioning of the clamping elements 824 is effected, is numbered 829.

The embodiment shown in FIG. 26 differs from the embodiment shown in FIG. 25 only in the configuration of the system used to effect the drive in the peripheral direction. In this embodiment, the tool system module 2 is installed directly on the spindle 4. The drive is effected through the drive body 950, for which a recess 952 is provided in the tool system module 2 and which is configured in one piece with a centering cylinder section 954. The centering cylinder 12 engages with clearance with this centering cylinder section. Side cuts 960 extend from an annular space 956 which is supplied with compressed air for cleaning through at least one radial drilling 958; as has been described above, these side cuts emerge on the matching surfaces between the components 2 and 4 which are to be cleaned.

The cleaning of the cylindrical matching surfaces between the centering cylinder 12 and the centering cylinder section 954 is effected through a helical groove 962 in the centering cylinder section 954.

Finally, reference is made to the embodiment shown in FIG. 27, which agrees with the embodiment shown in FIG. 24 with regard to the drive in the peripheral direction between the elements that are to be coupled. However, the configuration of the clamping elements 924 and the stabilizing system provided for this, as well as the configuration of the central lubricant supply channel are different.

A thrust cone part is numbered 934 and this is once again connected with a coupling piece 1000 with the hollow operating rod 20. The part 934 of the thrust cone has a precision drilling 936 in the side that is proximate to the tool system module in which a hollow journal 931 can be inserted so as to be sealed, and to which the tool system module 2 is secured. The hook-shaped end sections 930 of the clamping elements 924 rest in a supporting groove 974 of the machine tool spindle 4. Guide ribs 925 are formed on the side of the clamping elements 924 that are remote from the claw sections 926 and these fit precisely in slots 947 of a stabilizing body 946. Within the area of the guide ribs 925 there is a cam surface 948 formed on the outside of the coupling piece 1000, on which a control section 949 of the guide ribs 925 can slide. In the coupled state, the control section 949 is accommodated completely in a recess 945 of the coupling piece 1000 (see FIG. 27B). If the operating rod 20 is moved to the left as in FIG. 27A, the cam surface 948 enters into functional engagement with the control sector 949, which means that the claw sections 926 are pivoted positively out of the groove-like recess 36.

Of course, other versions of the coupling system are possible. In particular, combinations of details from the above-described embodiments can be combined with each other. It is also possible, in particular, to provide for pre-centering of the embodiments as shown in FIGS. 19 to 23, without simultaneously involving the hollow cylindrical continuation to seal the cooling agent supply channel. Instead of this seal as shown in FIGS. 19 to 23, it is also possible to provide a cooling agent transfer element as shown in FIG. 13.

Driving the elements that have been coupled in the peripheral direction can also be effected or improved in that the opposing plane surfaces are engaged in each other through face serations which can be figured either to be centering or not self-centering. Face serations of this kind can also be provided on the radial matching surfaces that are in contact with each other and/or on the purely opposing radial surfaces, in which connection intermediate meshing rings can also be used.

As a variation from the embodiments described above, it is also possible to pass media other than compressed air through the system of flushing channels. Neither is the continuation 12, 12' on the part of the coupling system that is on the tool system module side confined to a configuration in which exclusively cylindrical matching surfaces are provided. It is also possible to work with conical surfaces in this area. Finally, it is also possible to work with a positive locking connection to the opposing piece on the part of the coupling that is on the machine-tool side, in the area in which the extensions engage. Here, it is also possible to use any cross-section that differs from a circular cross-section as the cross-sectional shape of the elements that engage with each other.

The operating body for the clamp elements that is shown above as a thrust cone can also be of a shape that varies from the embodiments shown. In place of the conical operating surface on the thrust cone other suitable curved surfaces can be used, which act either directly with the contact surfaces on the clamp elements or indirectly with a suitable adjusting body interposed on the connecting elements. In this way, any control of the adjusting path for the clamp elements can be achieved, so that, for example, at the start of the return travel of the operating lever there is a relatively rapid outward pivoting motion of the claw sections, which will provide for a different movement in regard to the generation of a higher contact force as a result of a flatter rise of the contact area pairing.

In place of the variation by which the cooling agent transmission body is connected rigidly with the coupling element that is on the tool system module side, it is of course also possible to connect a cooling agent transmission body of this kind rigidly with the thrust body which means that then the cooling agent transmission body engages so as to be sealed in a correspondingly configured inside recess on the side of the tool system module.

The contact surface section of the cooling agent transmission body is of course not restricted to a spherical surface. Other flat configurations, for example, the configuration of a conical surface, are also conceivable, in which connection it can be advantageous to work with additional sealing systems, for example, an O-ring in the area of the sealing contact surfaces.

Instead of using a centering ring or front flange of wear-resistant material, it is also conceivable that these components can be provided with a wear-resistant coating only in the area of the functional surfaces. For the event that such wear-resistant coatings are used, in some cases it may be possible to dispense with a separate centering ring.

In the following, those features belonging to the invention which in combination with the core of the invention as expressed in the main claim either per se or in combination with each other are of particular advantage, will be presented in the following overview. It is advantageous and expedient if:

- the extension is formed by a centering cylinder (12; 12') for which, on the machine tool side, there is a centring recess (18) of a spindle (4; 4'); and wherein on the sides of the tool system module (2; 2') that bears the centering cylinder (12) there is at least one recess (38) for at least one driver claw (42; 550; 580; 604; 622; 882; 950) on the recess (18);

- the plane surfaces (8, 14) through which the elements that are to be coupled to each other can be pressed together are formed by radial annular surfaces (14; 14A);

- the wedge drive (22) has a thrust body (34; 434; 734; 834; 934) that lies within the claw sections (26; 426; 726; 826; 926) and which is connected with the operating rod (20), that can be brought into contact with the matched contact surfaces (92) of the clamp claws;

- the thrust body (34; 434; 734; 834; 934) is attached on the end of the operating rod (20) that is proximate to the tool system module (2; 2') the stroke of which that is required to release the coupling is matched to the insertion dimension of the claw sections (26; 426; 726; 826; 926) in the groove-like recess (36) and the configuration of the wedge angle (434A, 434B) of the thrust cone;

- the operating rod (20) has some clearance in the coupling element (4; 4') on the machine tool side, at least during the clamping process (20);

- the end sections (30; 430; 730; 830; 930) of the clamp-like clamp claws (24; 424; 724; 824; 924) engage in a supporting groove (74; 474; 774; 874; 974) of the recess (18), the supporting groove being matched to the configuration of the end sections such that the claw sections of the clamp claws can pivot into and out of the groove-like recess (36) of the centering cylinder (12; 12') whilst remaining in engagement in the supporting groove;

- the thrust body (34; 434; 734; 834; 934) has a cylinder shaped coupling extension (100; 500; 800; 900; 1000) on the side that is remote from the tool system module (2; 2') through which it can be connected with the operating rod (20), preferably by a screw connection;

- the thrust body (34; 434; 834) has a hollow cylindrical extension (112; 512; 912) on the side that is remote from the operating rod (20), which can be inserted so as to be sealed in a coaxial recess (114; 514; 515; 914; 915) in the tool system module (2);

- the operating rod (20) has a continuous longitudinal drilling (120);

- the groove-like recess (36) in the extension (12; 12') is formed from a V-section annular groove;

- the clamp claws (24; 424; 724; 824; 924) lie flat on one slope of the groove-like recess (36) in the extension (12; 12');

- the clamp claws (12; 424; 724; 824; 924) lie flat on one slope (76) of the supporting groove (74; 474; 774; 874; 974) when in the coupled state;

- the centering recess (18) in the engagement area of the centering cylinder (12; 12') is formed by a centering ring (140; 560; 590; 630; 880; 960) which is optionally secured on the spindle (4; 4') so as to be radially adjustable;

- the centering ring (140; 560; 590; 630; 880; 960) is of wear-resistant material, such as, for example, hard metal or hardened steel;

- the clamping claws (24; 424; 724; 824; 924) are produced by the radial separation of a sleeve-like body (78), which forms annular beads (26; 30) which has an annular ring (26; 30) that projects radially outwards on its face;

- a flushing channel system supplied preferably with compressed air (30 to 326; 570 to 576; 586 to 589; 596, 599; 604 to 608; 886 to 890; 956 to 960) to clean the functional surfaces on the elements of the coupling system that are to be connected which are to be brought into engagement with each other;

- the plane surfaces by which the parts that are to be coupled together can be pressed agains each other, are formed on the sides of the tool system module by a radial annular surface (8) and on the side of the spindle (4) by radial annular surface segments (14A) or sections, that are preferably separated from each other by diametrically extending grooves (324), each of which has at least one opening (322) of the compressed air flushing channels (320; 574; 586; 596; 608; 960);

- the supporting groove (74) is formed in a driver ring (44) inserted in the centering recess (18), that transfers peripheral forces onto the tool system module (2; 2');

- the driver ring (44) supports at least one driver claw (42) for which there is a recess (38) in the face of the centering cylinder (12);

- the centering recess (18) turns into a radial shoulder (50) in a depression (54) in which a suitably formed driver extension (52) of the driver ring (44) engages positively so as to create a non-rotating connection between the machine tool spindle (4; 4') and the driver ring (44);

- the driver extension (52) is configured as a prism with preferably convex curved outer surfaces (56);

- the driver extension (52) is of essentially a K-profile;

- the driver ring (44) supports two diametrically opposed driver claws (42), of which the plane of symmetry ($E_S$) subtends an angle of 30° with one of the three axial planes ($E_A$) through the edges (130) of the driver extension (52);

- the clamp claws (24) are guided in a radial direction in axial grooves (70) of a guide body (64) that can be connected rigidly with the portion of the coupling system on the machine tool side;

- the guide body (64) presses the driver ring (44) against the radial shoulder (50) in the centering recess (18);

- the driver ring (44) in the area of the driver extension (52) defines an annular space (314) that is sealed against the clamp claws (24) and which is supplied with compressed air, and from which preferably three side cuts (314) that are distributed equidistantly about the periphery extend outwards, each of which opens out into a longitudinal groove (316) on the outer side of the driver ring (44) and which are connected with an annular space (318) for supplying the compressed air flushing channels (320);

the guide body (64) can be screwed into the part (4; 4') of the coupling that is on the machine tool side;

the guide body (64) in the area of the thread has at least one notch (308) that extends essentially in an axial direction, for supplying the annular space (314) for the compressed air;

the thrust cone (34) has a cylindrical coupling collar (100) on the side that is remote from the tool system module (2), through which it can be connected to the operating rod (20), preferably by screw connection and wherein the coupling collar (100) has longitudinal recesses (306) on its outer side, in order to define an additional flushing channel between it and the cylindrical inner surface of the guide body (64), this being supplied through an intermediate space (304) between the draw bar (20) and the guide body (64) and which is open towards the claw sections (26) of the clamping claws (24);

the longitudinal grooves (316) in the driver ring (44) emerge radially within the annular space (318) and become an annular gap (326) that is open to the cylindrical precision surface 816), this being perferably a peripheral annular gap;

at least one longitudinal notch (308) and the intermediate space (304) between the draw bar (20) and the guide body (64) extend from a common compressed air supply chamber (302) that is supplied with compressed air through an annular channel (300) between the draw bar (20) and the spindle (4);

the cylindrical inner surface of the guide body (64) has an annular groove (96) to accommodate a ring (98) that is elastic in a radial direction, by which the thrust cone (34) can be stabilized radially;

the thrust cone (34'; 936) has an axial central drilling (144;936), in which a hollow journal (112'; 938) that is secured in the tool system module (2'; 2) can be inserted so as to be sealed during the coupling process;

the claw section (26) has on its outer side a wedge slope (84) that falls away to the tool system module (2; 2');

the clamping claws (24; 424; 824) are tensioned towards the inside by means of an elastic ring (118; 118'; 526; 829) the ring preferably being accommodated in a groove (128) that is adjacent to the claw section (26);

the supporting groove (474; 774; 874; 974) is formed in a machine tool spindle (4);

the supporting groove (874) is defined by a machine tool spindle (4) with a front flange (880);

at least two preferably diametrically opposing driver claws (550; 580; 604; 622; 882; 950) are provided for the drive between the elements (2; 4) that are to be coupled, it being possible to bring these into precision function engagement with suitably configured recesses (38) in the other coupling element;

a face toothing between the opposing radial surfaces of the elements (2; 4) that are to be coupled;

the driver claws (550; 580; 604; 622; 882; 950) are provided on the coupling element (4) on the machine tool side;

the driver claws (550; 604) work in conjunction with recesses (38) in the face of the centering cylinder (12);

the driver claws have two driver stones (550) that are accommodated in radial grooves (552) of the machine tool spindle (4), preferably being screwed into these, said driver stones extending through corresponding preferably face end recesses (571) of the centering ring (560), this being secured to the machine tool spindle (4);

openings (564) are formed in the centering ring (560) the retaining screws (556) of the driver stones (550) being accessible through said openings (564);

between the centering ring (560) and the driver stone (550) there is an essentially radial flushing channel (510) that opens out into an annular space (572) between the centering ring (560) and the machine tool spindle (4), from which side cuts (574) extend to the radial annular surface sections (14A) that are to be cleaned;

the driver claws (580; 622; 882; 950) work in conjunction with recesses (884) in a connector flange for the tool system module;

the driver claws have two driver stones (570; 950) that are accommodated in radial grooves (582) of the connector flange of the machine tool spindle (4) and which are preferably screwed into these;

the driver stones (950) are configured in one piece with a centering ring ((954) or the centering cylinder (12);

the cylindrical precision surface of the centering ring (954) has a helical groove (962) to guide the flushing flow and/or a pressure relief or air bleed flow;

the driver claws have two driver stones (580) that are accommodated in radial grooves (592) of a centering ring (590) that is secured to the connecting flange of the machine tool spindle (4);

essentially axial flushing channels (596) are formed in the centering ring (590) these emerging on radial annular surface segments (14A), and through which the area pressure contact between the elements that are to be coupled is effected;

the driver claws are formed by driver lugs of a spindle front flange (880) that project radially inwards, to which the centering surfaces (814; 816) for the tool system module (2) that is to be coupled are formed;

intercommunicating grooves (890; 886) are machined into the centering surfaces (814; 816) in order to form at least one flow channel for a flushing flow and/or a pressure relief flow;

the drive bodies are formed from the lugs of a driver ring (620) that extend radially inwards, said driver ring being secured to the machine tool spindle, said ring overlapping a centering ring (630) with its lugs;

a precentering system (412; 401; 501; 513; 514) for the part of the tool system module (2) that is to be coupled;

the precentering system has a rounded surface section (412; 513) at the face end of the centering cylinder (12) and/or on the thrust body, said section being preferably spherical with a diameter that is slightly smaller than the diameter of the cylinder precision surfaces (10, 16; 514);

the precentering system has a pair of outer surfaces (501, 513) of a cone section (434, 500) that is connected with the operating rod (20), said surfaces being axially separated, in which connection the outer surface (501)

that is remote from the tool system module (2) can be brought exclusively into engagement with an inner recess (401) of the machine tool spindle (4) if the operating rod (20) is in a position that releases the coupling, and whereby the other outer surface (513) that forms the centering aid remains out of engagement with an inner cylinder surface (514) of the tool system module (2);

the coupling collar (500; 800; 1000) of the thrust cone is guided so as to be sealed in an internal recess of the machine tool spindle (4);

the coupling collar (500; 800; 900; 1000) supports a device (435; 746; 827; 945; 948) for the lateral stabilization of the clamping claws (424; 724; 824; 924);

the stabilizing system is formed from projections (435) on the outer side of the coupling collar (500), these being arranged equidistantly about the periphery;

the stabilizing system is formed from a plurality of radial slots (747; 847; 947) in which guide sections (725; 825; 925) of the clamping claws engage with some clearance;

the radial slots (827) are formed in the coupling collar (900);

the radial slots (747) are formed in a pressure body (746) that presses against the control surface (750) of the clamping claws through a spring system (748) in order to pivot its claw sections out of the groove-like recess (36) in the release state;

the radial slots are formed in a stabilizing body (946), that is located behind the clamp claws (924) and into which a cam-like extension (925) of the span claws protrudes, for which a control surface (948, 945) is provided in the coupling collar (1000) in order to bring about a positive pivoting of the claw sections (926) out of the groove-like recess when the coupling system is uncoupled;

the thrust body (734; 934) has an inside recess (736; 936) on the side that is proximate to the tool system module (2) in which a cooling agent transfer body (738; 938) is accommodated so as to be sealed;

the cooling agent transfer body (938) is connected rigidly with the coupling element (2) on the tool system module side, for example, by means of a screwed connection;

the cooling agent transmission body is formed from a hollow plunger (738) that is guided in the thrust cone that is tensioned through a spring (740) in the direction of the tool system module (650; 660);

the hollow plunger (738) has a preferably spherical sealing surfcase (742) for connection to a central cooling agent drilling in the area of the tool system module (2);

the hollow cylinder shaped extension (512; 912) has a guide lug (513; 913) at the end, behind which is arranged a sealing ring (518; 918);

two thrust cone surfaces (434A; 434B) that form an angle are arranged on the thrust cone, of which the thrust cone surface (434A) that is remote from the tool system module (2) subtends a greater angle with the central axis of the coupling system than the outer thrust cone surface (434B);

the centering ring (560; 590; 630; 880; 950) is of wear-resistant material;

the clamping claws (424; 824) are sprung radially inwards by means of an elastic ring (526; 829);

the extension (12; 12') has cylindrical precision surfaces, and in particular is formed cylindrically;

the extension (12) has spherically formed precision surfaces, and is perferably formed as a cone;

the extension (12) has a cross sectional configuration that is other than circular, through which a drive is effected in the peripheral direction.

The present invention has been described on the basis of the point of intersection between a tool system module and a machine tool. In an equally advantageous way the present invention can also be used for a point of intersection between a tool, a tool carrier, and a manipulator system provided for this, as in, for example, a tool or tool changing or tool transporting system, in which connection, in particular in the case of the manipulation of heavy systems, the advantages inherent in this can be used effectively.

The present invention thus creates a coupling system between a workpiece, or a tool carrier, for example, a tool system module, for example in the form of a tool receptacle, and a manipulator system, such as, for example, a machine tool, and in particular a spindle. In order to provide for the rapid initiation and release of the connection between these components, whilst making large axiale forces available, a clamping system with an operating rod is provided, by means of which a wedge drive is controlled, with which clamp elements provided in one of the parts that are to be coupled can be pressed essentially outwards into a suitably considered recess in the other part that is to be coupled. The clamp elements are arranged in at least three clamp-like clamping claws that are arranged at identical angular distances from each other, these claws being essentially parallel to the centering extension of the tool receptacle and while being supported in a centering recess of the spindle can be pivoted with a claw section which in the coupled state lies radially within the centering extension, in a groove-like recess of the centering extension. This coupling system is characterized by a high level of flexibility with regard to operational potential and by the fact that it can be produced economically.

The embodiments of the invention in which an exclusive property or privilege is claimed are defined as follows:

1. A coupling device for use between a workpiece or tool-carrier element, such as, for example, a tool system module, for example in a form of a tool receptacle, and a manipulator device, with a receptacle provided by the manipulator device for a centering extension of the tool carrier element and a clamping device to generate a contact force between plane surfaces of the parts to be coupled, in which the clamping device has an operating rod, by which a wedge drive can be operated, with which the clamping elements that are provided in one part to be coupled can be pressed essentially radially outward in a correspondingly configured recess on the other part to be coupled, characterized in that the clamping elements are a component of a clamping claw arrangement, bridging in a clamplike manner a seam point between the parts to be coupled, with at least three clamping points distributed in a uniform angular distribution, in which the clamping claw arrangement with its clamping bar extends essentially parallel to a centering extension of the tool system module, having on one end a radially outwardly projecting holding section which is received into a corresponding radial recess of a receptacle and on the other end forms claws defining the clamping points, which can be pressed radially outward in a groove-like recess of an extension for clamping the part to be coupled under axially firm support over holding section by means of the wedge drive.

2. A holding apparatus, comprising:

an operating rod;

a wedge drive including clamping elements for pressing radially outwardly into a recess of a part to be held, said wedge drive coupled to and clamping in response to the operating rod;

wherein said clamping elements form a clamping claw and clamp the part to be held using at least three clamping points;

wherein the clamping claw extends parallel to a centering extension of a tool system module to which the holding apparatus is mounted; and wherein said clamping elements include on one end a radially outwardly projecting holding section which is received into a corresponding radial recess of a receptacle and on another end forms claws of the clamping claw which clamp the part to be held.

* * * * *

UNITED STATES PATENT AND TRADEMARK OFFICE
CERTIFICATE OF CORRECTION

PATENT NO. : 5,509,763

DATED : April 23, 1996

INVENTOR(S) : REINAUER et al.

It is certified that error appears in the above-indentified patent and that said Letters Patent is hereby corrected as shown below:

In Figure 12, change "42" to --92-- as shown on attached sheet.

In Figure 24A, change "741" to --747-- as shown on attached sheet.

Column 10, line 22, change "this has a radial inner shoulder 60," to --this has an axial inner shoulder,--.

Column 12, line 12, change "$42_{10}$" to --42--.

Column 18, line 66, change "clamping elements 74" to --clamping elements 724--.

Column 19, line 66, change "journal 931" to --journal 938--.

UNITED STATES PATENT AND TRADEMARK OFFICE
CERTIFICATE OF CORRECTION

PATENT NO. : 5,509,763
DATED : April 23, 1996
INVENTOR(S) : REINAUER et al.

It is certified that error appears in the above-indentified patent and that said Letters Patent is hereby corrected as shown below:

Column 21, line 64, change "(112; 512; 912)" to --(512; 912)--;

lines 66-67, change "sealed in a coaxial recess (114; 514; 515; 914; 915)" to --sealed in a coaxial recess (514; 515; 914; 915)--.

Signed and Sealed this

Fourteenth Day of January, 1997

Attest:

BRUCE LEHMAN

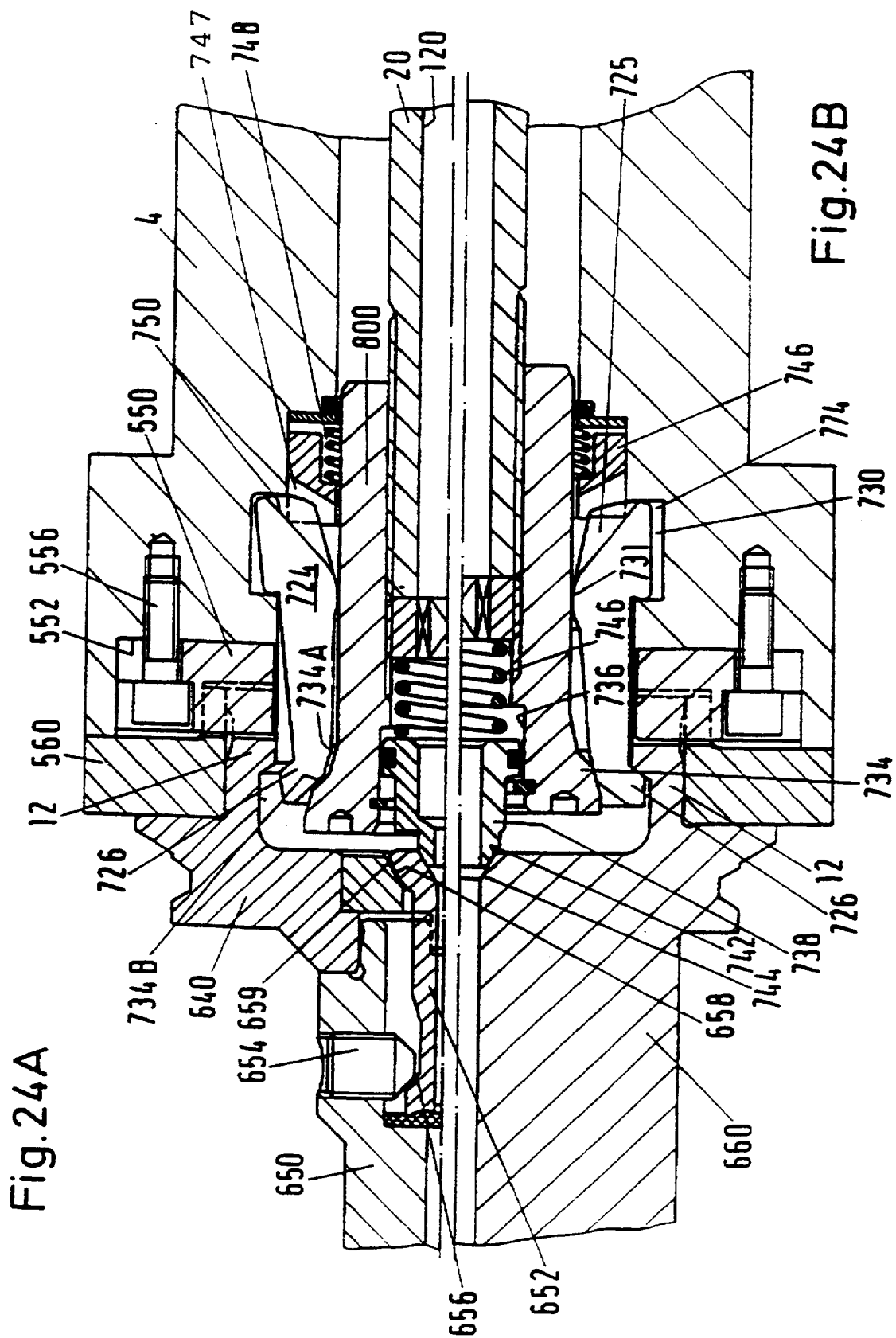

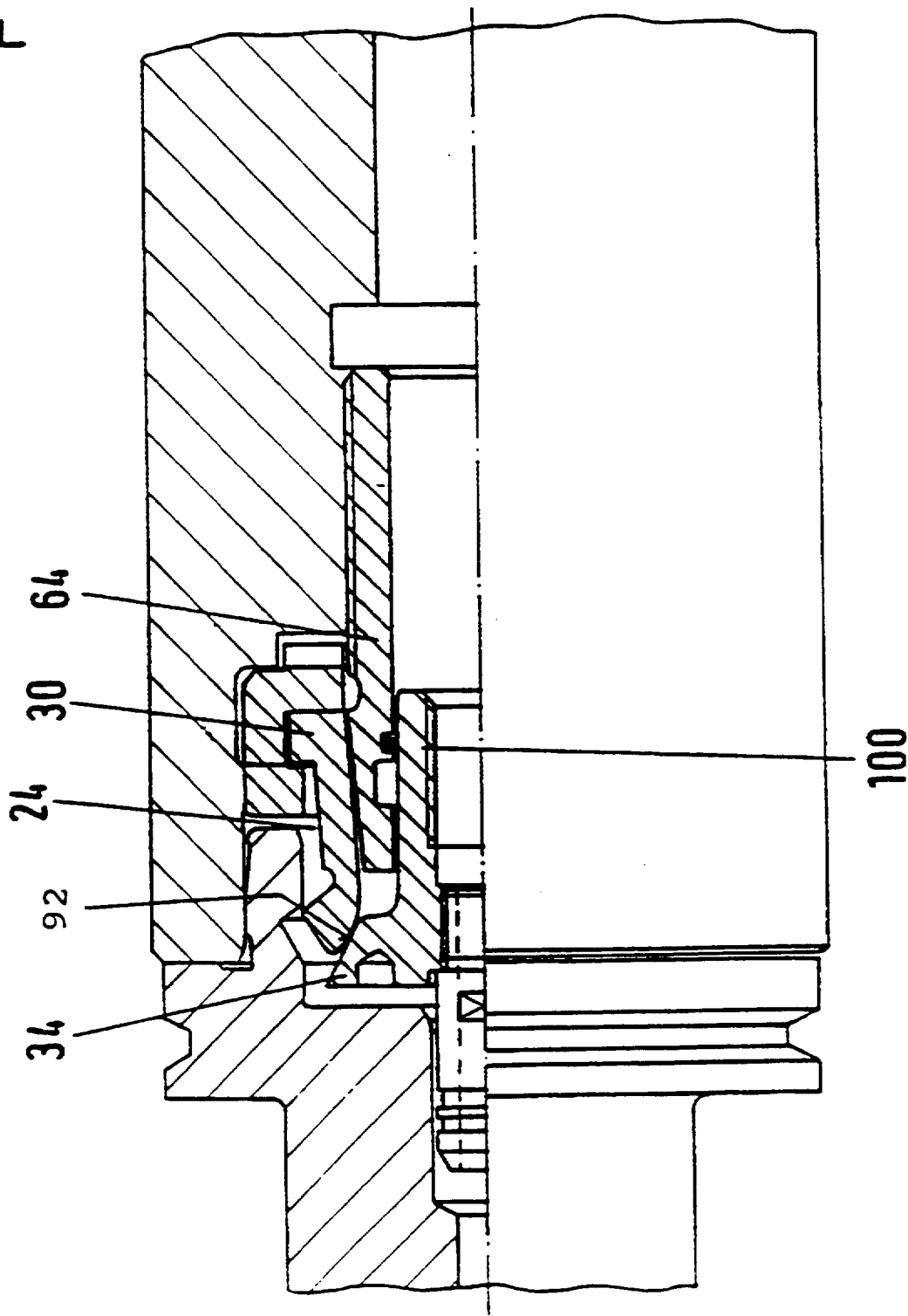

Attesting Officer     Commissioner of Patents and Trademarks